(12) United States Patent
Jeong

(10) Patent No.: US 10,857,988 B2
(45) Date of Patent: Dec. 8, 2020

(54) ELECTRIC BRAKE SYSTEM AND OPERATING METHOD THEREOF

(71) Applicant: MANDO CORPORATION, Gyeonggi-do (KR)

(72) Inventor: Hyojin Jeong, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 44 days.

(21) Appl. No.: 16/143,472

(22) Filed: Sep. 27, 2018

(65) Prior Publication Data
US 2019/0100187 A1    Apr. 4, 2019

(30) Foreign Application Priority Data

Sep. 29, 2017  (KR) .................. 10-2017-0127492
Jan. 30, 2018  (KR) .................. 10-2018-0011448

(51) Int. Cl.
| | | |
|---|---|---|
| B60T 13/68 | (2006.01) | |
| B60T 8/40 | (2006.01) | |
| B60T 13/74 | (2006.01) | |
| B60T 13/14 | (2006.01) | |
| B60T 7/04 | (2006.01) | |
| B60T 13/66 | (2006.01) | |

(52) U.S. Cl.
CPC ............ B60T 13/686 (2013.01); B60T 7/042 (2013.01); B60T 8/4081 (2013.01); B60T 13/145 (2013.01); B60T 13/146 (2013.01); B60T 13/662 (2013.01); B60T 13/745 (2013.01)

(58) Field of Classification Search
CPC ...... B60T 8/4072; B60T 8/4081; B60T 7/042; B60T 13/686; B60T 13/741; B60T 13/745
See application file for complete search history.

(56) References Cited

U.S. PATENT DOCUMENTS

| | | | |
|---|---|---|---|
| 10,583,819 B2* | 3/2020 | Kim ..................... | B60T 13/662 |
| 2017/0158180 A1* | 6/2017 | Kim ..................... | B60T 13/745 |
| 2017/0334417 A1* | 11/2017 | Choi .................... | B60T 13/68 |
| 2018/0111593 A1* | 4/2018 | Kim ..................... | B60T 13/745 |
| 2018/0111594 A1* | 4/2018 | Kim .......................... | B60T 8/17 |
| 2018/0148031 A1* | 5/2018 | Knechtges ............ | B60T 8/4077 |
| 2019/0100186 A1* | 4/2019 | Jeong ................... | B60T 8/4081 |
| 2019/0232935 A1* | 8/2019 | Kim ..................... | B60T 8/4086 |
| 2019/0366997 A1* | 12/2019 | Jeong ................... | B60T 13/167 |
| 2020/0079338 A1* | 3/2020 | Roh ...................... | B60T 13/66 |

FOREIGN PATENT DOCUMENTS

WO    WO-2016087506 A1 *  6/2016  ........... B60T 13/745

* cited by examiner

Primary Examiner — Thomas J Williams
(74) Attorney, Agent, or Firm — Ladas & Parry, LLP

(57) ABSTRACT

Disclosed are an electronic brake system and an operating method thereof: including a master cylinder for discharging a pressurized medium in accordance with a displacement of a brake pedal, a simulation apparatus for providing a pedal feeling to a driver, a hydraulic pressure supply apparatus for generating a hydraulic pressure by operating a hydraulic piston by an electrical signal outputted corresponding to the displacement of the brake pedal, and a hydraulic pressure control unit for controlling the hydraulic pressure of the pressurized medium supplied to each of wheel cylinders, and performing a normal operation mode, an abnormal operation mode and an inspection mode.

15 Claims, 10 Drawing Sheets

ELECTRIC BRAKE SYSTEM AND OPERATING METHOD THEREOF

CROSS-REFERENCE TO RELATED APPLICATION(S)

This application is based on and claims priority under 35 U.S.C. § 119 to Korean Patent Application No. 10-2017-0127492, filed on Sep. 29, 2017 and Korean Patent Application No. 10-2018-001148, filed on Jan. 30, 2018 in the Korean Intellectual Property Office, the disclosures of which are incorporated by reference herein in their entireties.

BACKGROUND

1. Technical Field

The present disclosure relates to an electronic brake system and an operating method thereof, and more particularly, to an electronic brake system and an operating method thereof for generating a braking force using an electrical signal corresponding to a displacement of a brake pedal.

2. Description of the Related Art

A brake system for braking is essentially installed in a vehicle, and various types of brake systems have been proposed for the safety of a driver and passengers.

A conventional brake system mainly uses a method of supplying hydraulic pressure necessary for braking to wheel cylinders using a mechanically connected booster when a driver depresses a brake pedal. However, as demand for the market to implement various braking functions in response to the operating environment of vehicles is increasing, in recent years, an electronic brake system including a hydraulic pressure supply apparatus, which receives an electrical signal corresponding to a braking force of a driver from a pedal displacement sensor that senses a displacement of the brake pedal when the driver presses the brake pedal and supplies a hydraulic pressure required for braking to the wheel cylinders, has come into wide use.

In the electronic brake system, an electrical signal is generated and provided according to the operation of the brake pedal by the driver in a normal operation mode, and the hydraulic pressure supply on the basis of the electrical signal is electrically operated and controlled so that the hydraulic pressure necessary for braking is generated and transmitted to the wheel cylinders. Thus, such electronic braking system can be operated and controlled electronically to implement complex and various braking operations. However, the electronic braking system may threaten the safety of passengers because when a technical problem arises in an electrical component, the hydraulic pressure necessary for braking is not stably formed.

Therefore, the electronic brake system enters an abnormal operation mode when a component element fails or is out of control, and in this case, a mechanism is required in which the operation of the brake pedal by the driver must be directly linked to the wheel cylinder. That is, in the abnormal operation mode of the electronic brake system, as the driver applies pressure to the brake pedal, the hydraulic pressure required for braking must be generated immediately, and this hydraulic pressure must be able to be transmitted directly to the wheel cylinders.

SUMMARY

It is an aspect of the present disclosure to provide an electronic brake system capable of stably providing a braking pressure of a vehicle.

It is an aspect of the present disclosure to provide an electronic brake system capable of effectively performing braking even in various operating situations of a vehicle.

It is an aspect of the present disclosure to provide an electronic brake system capable of stably generating a high braking pressure.

It is an aspect of the present disclosure to provide an electronic brake system with improved performance and operational reliability.

It is an aspect of the present disclosure to provide an electronic brake system with reduced durability of a product by reducing loads applied to components.

It is an aspect of the present disclosure to provide an electronic brake system capable of reducing the size and the number of components of a product.

Additional aspects of the present disclosure will be set forth in part in the description which follows and, in part, will be obvious from the description, or may be learned by practice of the disclosure.

In accordance with one aspect of the present disclosure, there may be provided an electronic brake system including: a hydraulic pressure supply apparatus generating a hydraulic pressure by operating a hydraulic piston by an electrical signal output corresponding to a displacement of a brake pedal and including a first pressure chamber formed at one side of the hydraulic piston movably accommodated in a cylinder block and a second pressure chamber formed at the other side of the hydraulic piston; and a hydraulic control unit including a first hydraulic circuit for controlling the hydraulic pressure transmitted to two wheel cylinders and a second hydraulic circuit for controlling the hydraulic pressure transmitted to two other wheel cylinders, wherein the hydraulic control unit includes a first hydraulic passage communicating with the first pressure chamber, second and third hydraulic passages branched from the first hydraulic passage and connected to the first and second hydraulic circuits respectively, a fourth hydraulic passage communicating with the second pressure chamber, fifth and sixth hydraulic passages branched from and rejoining the fourth hydraulic passage, a seventh hydraulic passage connecting the second hydraulic passage and the third hydraulic passage, an eighth hydraulic passage connecting the second hydraulic passage and the seventh hydraulic passage, and a ninth hydraulic passage connecting a point where the fifth and sixth hydraulic passages rejoin and the seventh or eighth hydraulic passage.

The hydraulic control unit may include a first valve provided on the second hydraulic passage to control the flow of a pressurized medium, a second valve provided on the third hydraulic passage to control the flow of the pressurized medium, a third valve provided on the fifth hydraulic passage to control the flow of the pressurized medium, a fourth valve provided on the sixth hydraulic passage to control the flow of the pressurized medium, a fifth valve provided on the seventh hydraulic passage to control the flow of the pressurized medium, and a sixth valve provided on the eighth hydraulic passage to control the flow of the pressurized medium.

The first valve may be provided as a check valve allowing only the flow of the pressurized medium in a direction from the first pressure chamber to the first hydraulic circuit, the second valve may be provided as a check valve allowing only the flow of the pressurized medium in a direction from the first pressure chamber to the second hydraulic circuit, the fourth valve may be provided as a check valve allowing only the flow of the pressurized medium in a direction from the second pressure chamber to the seventh or eighth hydraulic passage, and the third, fifth and sixth valves may be provided as solenoid valves controlling the flow of the pressurizing medium in both directions.

The electronic brake system may further include a master cylinder having first and second master chambers and first and second pistons provided respectively in the first and second master chambers and discharging the pressurized medium by the pressing force of the brake pedal.

The electronic brake system may further include: a first dump passage connecting the first pressure chamber and a reservoir storing the pressurized medium; a second dump passage connecting the second pressure chamber and the reservoir; a first dump valve provided on the first dump passage to control the flow of the pressurized medium and provided as a check valve allowing only the flow of the pressurized medium in a direction from the reservoir to the first pressure chamber; a second dump valve provided on the second dump passage to control the flow of the pressurized medium and provided as a check valve allowing only the flow of the pressurized medium in a direction from the reservoir to the second pressure chamber; and a third dump valve provided on a bypass passage connected in parallel with respect to the second dump valve on the second dump passage to control the flow of the pressurized medium and provided as a solenoid valve controlling the flow of the pressurized medium in both directions between the reservoir and the second pressure chamber.

The electronic brake system may further include a reservoir passage connecting the reservoir and the master cylinder, wherein the reservoir passage includes: a first reservoir passage connecting the first master chamber and the reservoir; a second reservoir passage connecting the second master chamber and the reservoir; a reservoir check valve provided on the first reservoir passage to control the flow of the pressurized medium and allowing only the flow of the pressurized medium in a direction from the reservoir to the first master chamber; and an inspection valve provided on a bypass passage connected in parallel with respect to the reservoir check valve on the first reservoir passage to control the flow of the pressurized medium and provided as a solenoid valve controlling the flow of the pressurized medium in both directions between the first master chamber and the reservoir.

The electronic brake system may further include: a first backup passage connecting the first master chamber and the first hydraulic circuit; a second backup passage connecting the second master chamber and the second hydraulic circuit; a first cut valve provided on the first backup passage to control the flow of the pressurized medium; and a second cut valve provided on the second backup passage to control the flow of the pressurized medium.

The electronic brake system may further include: a simulation apparatus connected to the master cylinder to provide a reaction force to the pressing force of the brake pedal; and a simulator valve for opening and closing a passage between the master cylinder and the simulation apparatus.

In accordance with another aspect of the present disclosure, there may be provided an electronic brake system including: a master cylinder having first and second master chambers and first and second pistons provided respectively in the first and second master chambers, and discharging a pressurized medium by the pressing force of a brake pedal; a hydraulic pressure supply apparatus generating a hydraulic pressure by operating a hydraulic piston by an electrical signal output corresponding to a displacement of the brake pedal and including a first pressure chamber formed at one side of the hydraulic piston movably accommodated in a cylinder block and a second pressure chamber formed at the other side of the hydraulic piston; and a hydraulic control unit including a first hydraulic circuit for controlling the hydraulic pressure transmitted to two wheel cylinders and a second hydraulic circuit for controlling the hydraulic pressure transmitted to two other wheel cylinders, wherein the hydraulic control unit further includes an auxiliary hydraulic passage connecting the second pressure chamber and the second master chamber, and an auxiliary valve provided on the auxiliary hydraulic passage to control the flow of the pressurized medium.

The auxiliary valve may be provided as a solenoid valve for controlling the flow of the pressurized medium in both directions.

In accordance with another aspect of the present disclosure, there may be provided a method of operating the electronic brake system wherein in a normal operation mode, a low-pressure mode for providing a relatively low hydraulic pressure and a high-pressure mode for providing a relatively high hydraulic pressure are operated sequentially in accordance with the level of the hydraulic pressure transmitted from the hydraulic pressure supply apparatus to the wheel cylinders.

In the low-pressure mode, the fifth and sixth valves may be opened, and a hydraulic pressure formed in the first pressure chamber by the forward movement of the hydraulic piston may be provided to the first hydraulic circuit and the second hydraulic circuit.

In the high-pressure mode, the fifth and sixth valves may be opened, a part of the hydraulic pressure formed in the first pressure chamber by the forward movement of the hydraulic piston after the low-pressure mode may be provided to the first hydraulic circuit and the second hydraulic circuit, the third valve may be opened, and a remaining part of the hydraulic pressure formed in the first pressure chamber may be supplied to the second pressure chamber.

In the release of the low-pressure mode, the fifth and sixth valves may be opened, and a negative pressure is formed in the first pressure chamber by the backward movement of the hydraulic piston so that the pressurized medium in the first hydraulic circuit and the second hydraulic circuit may be recovered into the first pressure chamber.

In the release of the high-pressure mode, the fifth and sixth valves may be opened, a negative pressure may be formed in the first pressure chamber by the backward movement of the hydraulic piston so that the pressurized medium in the first hydraulic circuit and the second hydraulic circuit is recovered into the first pressure chamber, the third valve may be opened, and the pressurized medium in the second pressure chamber may be supplied to the first pressure chamber.

In accordance with another aspect of the present disclosure, there may be provided a method of operating the electronic brake system wherein in an abnormal operation mode, the first cut valve may be opened to communicate with the first master chamber and the first hydraulic circuit, and the second cut valve may be opened to communicate with the second master chamber and the second hydraulic circuit.

In accordance with another aspect of the present disclosure, there may be provided a method of operating the electronic brake system wherein in an inspection mode for checking whether the master cylinder or the simulator valve is leaking, the inspection valve and the second cut valve are closed and the first cut valve is opened, a hydraulic pressure generated by an operation of the hydraulic pressure supply apparatus is provided to the first master chamber, and a hydraulic pressure value of the pressurized medium expected to be generated based on a displacement amount of the hydraulic piston is compared with the hydraulic pressure value of the pressurized medium provided to the first master chamber.

In accordance with another aspect of the present disclosure, there may be provided a method of operating the electronic brake system wherein in a normal operation mode, the auxiliary valve is opened, and at least a part of the hydraulic pressure formed in the second master chamber by the forward movement of the second master piston is supplied to the second pressure chamber, and wherein in an abnormal operation mode, the auxiliary valve is closed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
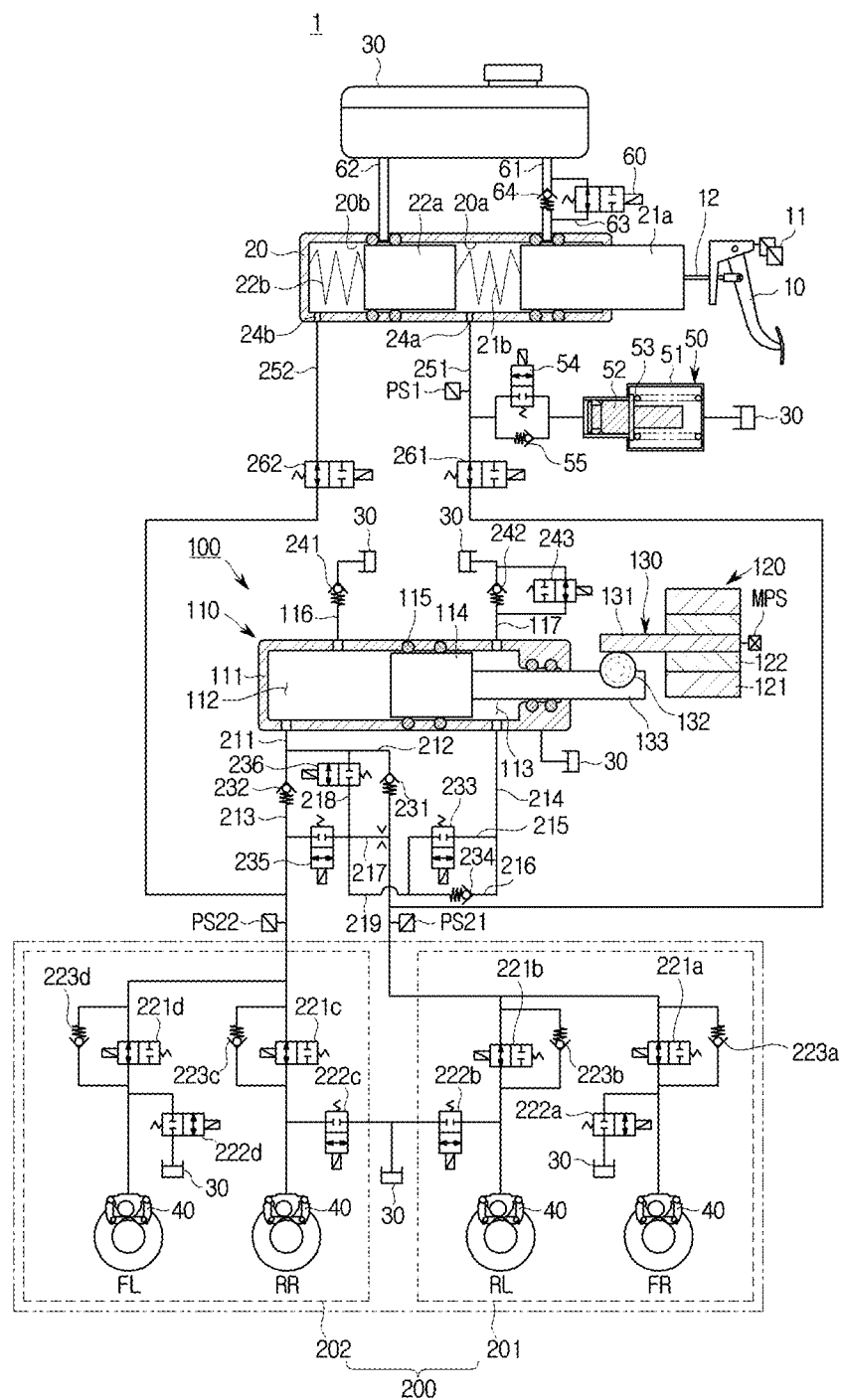
FIG. 1 is a hydraulic circuit diagram illustrating an electronic brake system according to an embodiment of the present disclosure.

FIG. 1 is a hydraulic circuit diagram illustrating an electronic brake system according to an embodiment of the present disclosure.

Referring to FIG. 1, an electronic brake system 1 according to an embodiment of the present disclosure may include a master cylinder 20 for pressurizing and discharging a pressurizing medium such as brake oil contained therein by a pressing force of a brake pedal 10, a reservoir 30 communicating with the master cylinder 20 and storing the pressurizing medium therein, a wheel cylinder 40 for receiving the hydraulic pressure of the pressurizing medium to perform braking of each of wheels RR, RL, FR and FL, a simulation apparatus 50 for providing a driver with the reaction force corresponding to the pressing force of the brake pedal 10, a hydraulic pressure supply apparatus 100 that receives an electric signal corresponding to the driver's braking will from a pedal displacement sensor 11 for sensing a displacement of the brake pedal 10 and generates a hydraulic pressure of the pressurizing medium through a mechanical operation, a hydraulic control unit 200 for controlling the hydraulic pressure transmitted to the wheel cylinders 40, and an electronic control unit (ECU; not shown) for controlling the hydraulic pressure supply apparatus 100 and various valves based on hydraulic pressure information and pedal displacement information.

The master cylinder 20 may be configured to include at least one chamber to pressurize and discharge the pressurizing medium therein. The master cylinder 20 may include a first master chamber 20a, a second master chamber 20b, and a first piston 21a and a second piston 22a provided in the first and second master chambers 20a and 20b, respectively.

The first piston 21a that is connected with an input rod 12 is provided in the first master chamber 20a, and the second piston 22a is provided in the second master chamber 20b. The pressurizing medium may be introduced into and discharged from the first master chamber 20a through a first hydraulic port 24a and may be introduced into and discharged from the second master chamber 20b through a second hydraulic port 24b. As an example, the first hydraulic port 24a may be connected to a first backup passage 251, which will be described later, and the second hydraulic port 24b may be connected to a second backup passage 252, which will be described later.

The master cylinder 20 according to an embodiment of the present disclosure may ensure safety in the event of failure of a component by independently including the first and second master chambers 20a and 20b. For example, the first master chamber 20a of the first and second master chambers 20a and 20b may be connected to the front right wheel FR and the rear left wheel RL of the vehicle and the second master chamber 20b may be connected to the front left wheel FL and the rear right wheel RR, so that the braking of the vehicle may be performed even if one of the first and second master chambers 20a and 20b fails.

Alternatively, unlike what is shown in the drawing, one of the two master chambers may be provided to be connected to the two front wheels FR and FL, and the other one may be provided to be connected to the two rear wheels RR and RL. In addition, one of the two master chambers may be provided to be connected to the front left wheel FL and the rear left wheel RL, and the other one may be provided to be connected to the rear right wheel RR and the front right wheel FR. That is, the first and second master chambers 20a and 20b of the master cylinder 20 may be variously connected to the wheels RR, RL, FR and FL.

A first spring 21b may be provided between the first piston 21a and the second piston 22a in the master cylinder 20, and a second spring 22b may be provided between the second piston 22a and an end of the master cylinder 20. That is, the first spring 21b may be accommodated in the first master chamber 20a and the second spring 22b may be accommodated in the second master chamber 20b.

The first piston 21a and the second piston 22a move as the driver operates the brake pedal 10 and the displacement is changed, and thus the first spring 21b and the second spring 22b are compressed. When the pressing force of the brake pedal 10 is released, the first spring 21b and the second spring 22b expand by their elastic force, so that the first and second pistons 21a and 22a may return to their original positions.

The brake pedal 10 and the first piston 21a of the master cylinder 20 may be provided to be connected by the input rod 12. The input rod 12 may be directly connected to the first piston 21a, or may be brought into close contact without a gap so that when the driver depresses the brake pedal 10, the brake pedal 10 may press the master cylinder 20 directly without a pedal invalid stroke section.

The first master chamber 20a may be connected to the reservoir 30 through a first reservoir passage 61 and the second master chamber 20b may be connected to the reservoir 30 through a second reservoir passage 62. A check valve 64, which blocks the flow of the pressurized medium from the first master chamber 20a to the reservoir 30 while allowing the flow of the pressurized medium from the reservoir 30 to the first master chamber 20a, may be provided on the first reservoir passage 61. That is, the check valve 64 may be provided to allow only the flow of the pressurized medium in a direction from the reservoir 30 toward the first master chamber 20a.

The first reservoir passage 61 may also be provided with an inspection passage 63 connected in parallel with respect to the check valve 64. Specifically, the inspection passage 63 may be provided as a bypass passage bypassing a front side and a rear side of the check valve 64 on the first reservoir passage 61. The inspection passage 63 provided as a bypass passage may be provided with an inspection valve 60 for controlling the flow of the pressurized medium.

The inspection valve 60 may be provided as a bidirectional valve for controlling the flow of the pressurized medium between the reservoir 30 and the master cylinder 20. The inspection valve 60 may be provided as a normally open type solenoid valve which operates to be closed when receiving an electrical signal from the electronic control unit, which will be described later, in a normally open state. The specific function and operation of the inspection valve 60 will be described later in detail.

The master cylinder 20 may include two sealing members (no reference numeral) disposed on front and rear sides of the first reservoir passage 61 and two sealing members (no reference numeral) disposed on front and rear sides of the second reservoir passage 62. The sealing members may be provided in a ring-shaped structure protruding from the inner wall of the master cylinder 20 or the outer circumferential surface of the first and second pistons 21a and 22a.

The simulation apparatus 50 is connected to the first backup passage 251, which will be described later, and may provide the driver with a reaction force against the pressing force of the brake pedal 10. Since the simulation apparatus 50 provides the reaction force corresponding to the pressing force applied to the brake pedal 10 by the driver, it is possible to provide the driver with a sense of pedaling to enable the brake pedal 10 to be finely operated, and thus the braking force of the vehicle may be finely adjusted.

Referring to FIG. 1, the simulation apparatus 50 includes a simulation chamber 51 provided to contain the pressurized medium discharged from the first hydraulic port 24a of the master cylinder 20, a reaction force piston 52 provided in the simulation chamber 51, a pedal simulator having a reaction force spring 53 for elastically supporting the reaction force piston 52, and a simulator valve 54 provided at a front side of the simulation chamber 51.

The reaction force piston 52 and the reaction force spring 53 are provided to have a certain range of displacement in the simulation chamber 51 by the pressurized medium flowing into the simulation chamber 51, the simulator valve 54 connects the front side of the simulation chamber 51 with the first master chamber 20a of the master cylinder 20, and a rear side of the simulation chamber 51 may be connected to the reservoir 30. Accordingly, the inside of the simulation chamber 51 may always be filled with the pressurized medium introduced from the reservoir 30 even when the reaction force piston 52 returns.

The reaction force spring 53 shown in the drawing is merely an example that may provide an elastic force to the reaction force piston 52 and may have various structures capable of storing elastic force. The reaction force spring 53 may be made of, for example, rubber or various members capable of storing elastic force by having a coil or a plate shape.

The simulator valve 54 may be provided on a passage connecting the first master chamber 20a of the master cylinder 20 and the front side of the simulation chamber 51. The simulator valve 54 may be provided as a normally closed type solenoid valve in a normally closed state. The simulator valve 54 is operated to be opened when the driver depresses the brake pedal 10 to transmit the pressurized medium in the first master chamber 20a to the simulation chamber 51.

A simulator check valve 55 connected in parallel with the simulator valve 54 may be provided on the passage connecting the first master chamber 20a of the master cylinder 20 and the front side of the simulation chamber 51. Specifically, the simulation apparatus 50 is connected to the first master chamber 20a of the master cylinder 20 by a passage branched from the first backup passage 251, which will be described later, and the simulator check valve 55 is provided to block the flow of the pressurized medium from the first master chamber 20a or the first backup passage 251 to the simulation chamber 51 while allowing the flow of the pressurized medium from the simulation chamber 51 to the first master chamber 20a or the first backup passage 251. Accordingly, the pressurized medium in the first master chamber 20a flows into the simulation chamber 51 through the simulator valve 54 when the driver depresses the brake pedal 10, and the pressurized medium in the simulation chamber 51 flows into the first master chamber 20a or the first backup passage 251 through the simulator valve 54 and the simulator check valve 55 when the driver releases the brake pedal 10, so that a quick return of the simulator pressure may be achieved. Further, even if the hydraulic pressure in the simulation chamber 51 is higher than the pressure of the pressurized medium in the first master chamber 20a or the first backup passage 251, the pressurizing medium in the simulation chamber 51 is discharged to the first master chamber 20a or the first backup passage 251 through the simulator check valve 55, so that the simulation apparatus 50 may quickly return to an operation ready state.

The operation of the simulation apparatus 50 will be described below. When the driver presses and operates the brake pedal 10, the simulator valve 54 is opened so that the pressurized medium in the first master chamber 20a is supplied to a front side (left side of the reaction force piston with respect to the drawing) of the reaction force piston 52 in the simulation chamber 51, and thus the reaction force piston 52 compresses the reaction force spring 53, thereby providing a sense of pedaling to the driver. At this time, the pressurized medium which has been filled in a rear side of the reaction force piston 52 (right side of the reaction force piston with respect to the drawing) in the simulation chamber 51 is transmitted to the reservoir 30. Thereafter, when the driver releases the brake pedal 10, the reaction force piston 52 returns to the original position as the reaction force spring 53 expands by the elastic force, and the pressurized medium which has been filled in the front side of the reaction force piston 52 in the simulation chamber 51 is discharged to the first master chamber 20a or the first backup passage 251 through the simulator valve 54 and the simulator check valve 55. At this time, the rear side of the reaction force piston 52 in the simulation chamber 51 is supplied with the pressurized medium from the reservoir 30 so that the inside of the simulation chamber 51 may be filled with the pressurized medium again.

As such, since the inside of the simulation chamber 51 is always filled with the pressurized medium, the friction of the reaction force piston 52 is minimized during the operation of the simulation apparatus 50 so that the durability of the simulation apparatus 50 is improved and the inflow of foreign matter from the outside may be blocked.

A plurality of the reservoirs 30 is shown in the drawing, and each of the reservoirs 30 has the same reference numeral. These reservoirs may be provided as the same component or may be provided as different components. For example, the reservoir 30 connected to the simulation apparatus 50 may be the same as the reservoir 30 connected to the master cylinder 20, or may be a reservoir capable of storing the pressurized medium independently of the reservoir 30 connected to the master cylinder 20.

The hydraulic pressure supply apparatus 100 is provided to receive an electric signal corresponding to the driver's braking will from the pedal displacement sensor 11 for sensing a displacement of the brake pedal 10 and generate a hydraulic pressure of the pressurizing medium through a mechanical operation.

The hydraulic pressure supply apparatus 100 may include a hydraulic pressure providing unit 110 for providing a pressure of the pressurized medium transmitted to the wheel cylinders 40, a motor 120 for generating a rotational force by an electrical signal of the pedal displacement sensor 11, and a power converting unit 130 for converting the rotational motion of the motor 120 into a linear motion and transmitting the linear motion to the hydraulic pressure providing unit 110. The hydraulic pressure providing unit 110 may be operated not by a driving force supplied from the motor 120 but by a pressure provided by a high-pressure accumulator.

The hydraulic pressure providing unit 110 includes a cylinder block 111 having pressure chambers for receiving and storing the pressurized medium, a hydraulic piston 114 accommodated in the cylinder block 111, sealing members provided between the hydraulic piston 114 and the cylinder block 111 to seal the pressure chambers, and a drive shaft 133 for transmitting a power output from the power converting unit 130 to the hydraulic piston 114.

The pressure chambers may include a first pressure chamber 112 positioned forward (forward direction; leftward direction of the hydraulic piston with respect to the drawing) of the hydraulic piston 114, and a second pressure chamber 113 positioned rearward (backward direction; rightward direction of the hydraulic piston with respect to the drawing) of the hydraulic piston 114. That is, the first pressure chamber 112 is provided to be defined by the cylinder block 111 and a front end of the hydraulic piston 114 so that the volume of the first pressure chamber 112 varies according to the movement of the hydraulic piston 114, and the second pressure chamber 113 is provided to be defined by the cylinder block 111 and a rear end of the hydraulic piston 114 so that the volume of the second pressure chamber 113 varies according to the movement of the hydraulic piston 114.

The first pressure chamber 112 is connected to a first hydraulic passage 211, which will be described later, through a first communication hole 111a formed in the cylinder block 111, and the second pressure chamber 113 is connected to a fourth hydraulic passage 214, which will be described later, through a second communication hole 111b formed in the cylinder block 111.

The sealing members include a piston sealing member 115 provided between the hydraulic piston 114 and the cylinder block 111 to seal between the first pressure chamber 112 and the second pressure chamber 113, and a drive shaft sealing member (no reference numeral) provided between the drive shaft 133 and the cylinder block 111 to seal the second pressure chamber 113 and an opening of the cylinder block 111. The hydraulic pressure or the negative pressure in the first and second pressure chambers 112 and 113, which are generated by the forward or backward movement of the hydraulic piston 114, may be transmitted to the first and fourth hydraulic passages 211 and 214 without being leaked to the second pressure chamber 113 by being sealed by the piston sealing member 115, and hydraulic pressure or the negative pressure in the second pressure chamber 113, which are generated by the forward or backward movement of the hydraulic piston 114, may not be leaked to the outside of the cylinder block 111 by being sealed by the drive shaft sealing member.

The first and second pressure chambers 112 and 113 are connected to the reservoir 30 by first and second dump passages 116 and 117, respectively, and may receive and store the pressurized medium from the reservoir 30 through the first and second dump passages 116 and 117, or may transmit the pressurized medium to the reservoir 30. To this end, the first dump passage 116 may be connected to the reservoir 30 by communicating with the first pressure chamber 112 through a third communication hole 111c formed in the cylinder block 111, and the second dump passage 117 may be connected to the reservoir 30 by communicating with the second pressure chamber 113 through a fourth communication hole 111d formed in the cylinder block 111.

The motor 120 is provided to generate a driving force by an electrical signal output from the electronic control unit (ECU). The motor 120 may include a stator 121 and a rotor 122 and may provide a power for generating a displacement of the hydraulic piston 114 by rotating in a forward or reverse direction. A rotation angular velocity and a rotation angle of the motor 120 may be precisely controlled by a motor control sensor MPS. Since the motor 120 is a well-known technology, a detailed description thereof will be omitted.

The power converting unit 130 is provided to convert the rotational force of the motor 120 into a linear motion. For example, the power converting unit 130 may include a worm shaft 131, a worm wheel 132, and the drive shaft 133.

The worm shaft 131 may be formed integrally with the rotation shaft of the motor 120, and may rotate the worm wheel 132 by forming a worm on an outer circumferential surface of the worm shaft 131 so as to be engaged with the worm wheel 132. The worm wheel 132 is connected to be engaged with the drive shaft 133 to move the drive shaft 133 linearly and the drive shaft 133 is connected to the hydraulic piston 114 so that the hydraulic piston 114 may be slidably moved in the cylinder block 111.

Hereinafter, the above operations will be described again. When a displacement of the brake pedal 10 is sensed by the pedal displacement sensor 11, a sensed signal is transmitted to the electronic control unit, and the electronic control unit drives the motor 120 to rotate the worm shaft 131 in one direction. The rotational force of the worm shaft 131 is transmitted to the drive shaft 133 via the worm wheel 132, and a hydraulic pressure may be generated in the first pressure chamber 112 as the hydraulic piston 114 connected to the drive shaft 133 moves forward in the cylinder block 111.

Conversely, when the pressing force of the brake pedal 10 is released, the electronic control unit drives the motor 120 to rotate the worm shaft 131 in the opposite direction. Accordingly, the worm wheel 132 also rotates in the opposite direction, and a negative pressure may be generated in the first pressure chamber 112 as the hydraulic piston 114 connected to the drive shaft 133 moves backward in the cylinder block 111.

The generation of the hydraulic pressure and the negative pressure in the second pressure chamber 113 may be achieved by operating in reverse to the above-described operation. That is, when a displacement of the brake pedal 10 is sensed by the pedal displacement sensor 11, a sensed signal is transmitted to the electronic control unit, and the electronic control unit drives the motor 120 to rotate the worm shaft 131 in the opposite direction. The rotational force of the worm shaft 131 is transmitted to the drive shaft 133 via the worm wheel 132, and a hydraulic pressure may be generated in the second pressure chamber 113 as the hydraulic piston 114 connected to the drive shaft 133 moves backward in the cylinder block 111.

Conversely, when the pressing force of the brake pedal 10 is released, the electronic control unit drives the motor 120 in one direction to rotate the worm shaft 131 in one direction. Accordingly, the worm wheel 132 also rotates in one direction, and a negative pressure may be generated in the second pressure chamber 113 as the hydraulic piston 114 connected to the drive shaft 133 moves forward in the cylinder block 111.

As such, the hydraulic pressure supply apparatus 100 generates a hydraulic pressure or a negative pressure in the first pressure chamber 112 and the second pressure chamber 113 in accordance with the rotation direction of the worm shaft 131 driven by the motor 120, and whether braking should be carried out by transmitting the hydraulic pressure or the braking should be released by using the negative pressure may be determined by controlling the valves. A detailed description thereof will be described later.

Although not shown in the drawings, the power converting unit 130 may be configured as a ball screw nut assembly. For example, the power converting unit 130 may be configured to include a screw integrally formed with the rotation shaft of the motor 120 or connected to rotate together with the rotation shaft of the motor 120, and a ball nut coupled to the screw by a ball screw method in a restricted rotation state and linearly moving according to rotation of the screw. Since the structure of such ball screw nut assembly is a well-known technology, a detailed description thereof will be omitted. Also, the power converting unit 130 according to an embodiment of the present disclosure is not limited to any one structure as long as it can convert a rotational motion into a linear motion, and may be configured as an apparatus having various structures and means.

The hydraulic control unit 200 may be provided to control the hydraulic pressure transmitted to the wheel cylinders 40, and the electronic control unit (ECU) is provided to control the hydraulic pressure supply apparatus 100 and various valves based on the hydraulic pressure information and the pedal displacement information.

The hydraulic control unit 200 may include a first hydraulic circuit 201 for controlling the flow of hydraulic pressure transmitted to the two wheel cylinders 40 and a second hydraulic circuit 202 for controlling the flow of hydraulic pressure transmitted to the other two wheel cylinders 40, and may also include a plurality of passages and valves for controlling the hydraulic pressure transmitted from the master cylinder 20 and the hydraulic pressure supply apparatus 100 to the wheel cylinders 40.

Hereinafter, the hydraulic control unit 200 will be described with reference to FIG. 1 again.

Referring to FIG. 1, the first hydraulic passage 211 is provided to connect the first pressure chamber 112 and the first and second hydraulic circuits 201 and 202, and may be branched into a second hydraulic passage 212 communicating with the first hydraulic circuit 201 and a third hydraulic passage 213 communicating with the second hydraulic circuit 202. Accordingly, the hydraulic pressure generated in the first pressure chamber 112 by the forward movement of the hydraulic piston 114 may be transmitted to the first hydraulic circuit 201 and the second hydraulic circuit 202 through the second hydraulic passage 212 and the third hydraulic passage 213.

The second and third hydraulic passages 212 and 213 may be provided with a first valve 231 and a second valve 232 for controlling the flow of the pressurized medium, respectively. The first and second valves 231 and 232 may be provided as check valves which allow only the flow of the pressurized medium in a direction from the first pressure chamber 112 toward the first and second hydraulic circuits 201 and 202 and block the flow of the pressurized medium in the opposite direction. That is, the first and second valves 231 and 232 may allow the hydraulic pressure generated in the first pressure chamber 112 to be transmitted to the first and second hydraulic circuits 201 and 202 while the hydraulic pressure in the first and second hydraulic circuits 201 and 202 may be prevented from leaking to the first pressure chamber 112 through the second and third hydraulic passages 212 and 213.

The fourth hydraulic passage 214 may be provided to connect the second pressure chamber 113 and the first and second hydraulic circuits 201 and 202 and to be branched into a fifth hydraulic passage 215 and a sixth hydraulic passage 216, and the fifth and sixth hydraulic passages 215 and 216 may be provided so as to be joined again after being branched from the fourth hydraulic passage 214. In addition, a seventh hydraulic passage 217 may be provided such that both ends thereof communicate with rear sides of the first and second valves 231 and 232 on the second and third hydraulic passages 212 and 213, respectively, to connect the second hydraulic passage 212 and the third hydraulic passage 213, and an eighth hydraulic passage 218 may be provided such that both ends thereof communicate with a front side of the first valve 231 on the second hydraulic passage 212 and the seventh hydraulic passage 217, respectively, to connect the second hydraulic passage 212 and the seventh hydraulic passage 217. A ninth hydraulic passage 219 may be provided to connect the rejoined fifth and sixth hydraulic passages 215 and 216 to the seventh or eighth hydraulic passage 217 or 218.

A third valve 233 and a fourth valve 234 for controlling the flow of the pressurized medium may be provided on the fifth hydraulic passage 215 and the sixth hydraulic passage 216, respectively.

The third valve 233 may be provided as a bidirectional valve for controlling the flow of the pressurized medium between the fourth hydraulic passage 214 communicating with the second pressure chamber 113 and a hydraulic passage connected to the first or second hydraulic circuit 201 or 202. The third valve 233 may be provided as a normally closed type solenoid valve that operates to be opened when receiving an electrical signal from the electronic control unit in a normally closed state.

The fourth valve 234 may be provided as a check valve which allows only the flow of the pressurized medium from the fourth hydraulic passage 214 communicating with the second pressure chamber 113 toward the hydraulic passage connected to the first or second hydraulic circuit 201 or 202 while blocking the flow of the pressurized medium in the opposite direction. That is, the fourth valve 234 may prevent the hydraulic pressure in the hydraulic passage connected to the first or second hydraulic circuit 201 or 202 from leaking to the second pressure chamber 113 through the sixth hydraulic passage 216 and the fourth hydraulic passage 214.

The third valve 233 and the fourth valve 234 may be provided in parallel with each other as the fifth and sixth hydraulic passages 215 and 216 are branched from the fourth hydraulic passage 214 and are joined together again.

A fifth valve 235 and a sixth valve 236 for controlling the flow of the pressurized medium may be provided on the seventh hydraulic passage 217 and the eighth hydraulic passage 218, respectively.

The fifth valve 235 may be provided as a bidirectional valve for controlling the flow of the pressurized medium between the second hydraulic passage 212 and the third hydraulic passage 213 communicating with both of the ends of the seventh hydraulic passage 217, respectively, and controlling the flow of the pressurized medium in the seventh hydraulic passage 217 supplied to or transmitted from the eighth hydraulic passage 218 and the ninth hydraulic passage 219 connected to the seventh hydraulic passage 217. The fifth valve 235 may be provided as a normally closed type solenoid valve that operates to be opened when receiving an electrical signal from the electronic control unit in a normally closed state.

Although the reference numeral is not shown in the drawing, the seventh hydraulic passage 217 may be provided with an orifice for reducing the pulsation generated by the pressurized medium.

The sixth valve 236 may be provided as a bidirectional valve for controlling the flow of the pressurized medium between the second hydraulic passage 212 and the seventh hydraulic passage 217 communicating with both of the ends of the eighth hydraulic passage 218, respectively, and controlling the flow of the pressurized medium in the eighth hydraulic passage 218 supplied to or transmitted from the ninth hydraulic passage 219 connected to the seventh or eighth hydraulic passage 217 or 218. Like the fifth valve 235, the sixth valve 236 may be provided as a normally closed type solenoid valve that operates to be opened when receiving an electrical signal from the electronic control unit in a normally closed state.

The ninth hydraulic passage 219 may be provided to connect the point where the fifth and sixth hydraulic passages 215 and 216 branched from the fourth hydraulic passage 214 are rejoined and the seventh or eighth hydraulic passage 217 or 218.

Due to the configuration of the hydraulic passages and valves as described above, the hydraulic pressure generated in the second pressure chamber 113 by the backward movement of the hydraulic piston 114 is transmitted to the second and third hydraulic passages 212 and 213 through the fourth hydraulic passage 214, the fifth and sixth hydraulic passages 215 and 216, and the seventh hydraulic passage 217, and thus the hydraulic pressure generated in the second pressure chamber 113 may be transmitted to the first hydraulic circuit 201 and the second hydraulic circuit 202.

Further, both ends of the seventh hydraulic passage 217 are respectively connected to rear sides of the first and second valves 231 and 232 on the second and third hydraulic passages 212 and 213, and the fifth and sixth valves 235 and 236 are operated to be opened when an abnormality occurs in the operation of the first valve 231 or the second valve 232, so that the hydraulic pressure generated in the first pressure chamber 112 may be stably transmitted to the first hydraulic circuit 201 and the second hydraulic circuit 202, and unlike the above, when the third and fifth valves 233 and 235 are operated to be opened, the hydraulic pressure generated in the second pressure chamber 113 is stably transmitted to the first hydraulic circuit 201 and the second hydraulic circuit 202.

The fifth valve 235 and the sixth valve 236 may be operated to be opened when the pressure medium is drawn from the wheel cylinders 40 and supplied to the first pressure chamber 112 in order to release the hydraulic pressure applied to the wheel cylinders 40. This is because the first valve 231 and the second valve 232 provided respectively on the second hydraulic passage 212 and the third hydraulic passage 213 are provided as check valves allowing only the flow of the pressurized medium in one direction.

Hereinafter, the first hydraulic circuit 201 and the second hydraulic circuit 202 of the hydraulic control unit 200 will be described.

The first hydraulic circuit 201 may control the hydraulic pressure in the wheel cylinders 40 installed on the front right wheel FR and the rear left wheel RL, and the second hydraulic circuit 202 may control the hydraulic pressure in the wheel cylinders 40 installed on the front left wheel FL and the rear right wheel RR.

The first hydraulic circuit 201 may be connected to the first hydraulic passage 211 and the second hydraulic passage 212 and may be supplied with hydraulic pressure from the hydraulic pressure supply apparatus 100, and the second hydraulic passage 212 may be provided to be branched into two passages connected to the front right wheel FR and the rear left wheel RL, respectively. Likewise, the second hydraulic circuit 202 may be connected to the first hydraulic passage 211 and the third hydraulic passage 213 and may be supplied with hydraulic pressure from the hydraulic pressure supply apparatus 100, and the third hydraulic passage 213 may be provided to be branched into two passages connected to the front left wheel FL and the rear right wheel RR, respectively.

The first and second hydraulic circuits 201 and 202 may respectively include a plurality of inlet valves 221 (221a, 221b, 221c, and 221d) to control the flow and pressure of the pressurized medium. As an example, the first hydraulic circuit 201 may be provided with the two inlet valves 221a and 221b connected to the second hydraulic passage 212 to control the hydraulic pressure transmitted to each of the two wheel cylinders 40, and the second hydraulic circuit 202 may be provided with the two inlet valves 221c and 221d connected to the third hydraulic passage 213 to control the hydraulic pressure transmitted to each of the two wheel cylinders 40.

The inlet valves 221 are disposed on upstream sides of the wheel cylinders 40, and may be provided as a normally open type solenoid valve which operates to be closed when receiving an electrical signal from the electronic control unit in a normally open state.

The first and second hydraulic circuits 201 and 202 may include check valves 223a, 223b, 223c, and 223d connected in parallel to the respective inlet valves 221a, 221b, 221c, and 221d. The check valves 223a, 223b, 223c and 223d may be provided on bypass passages connecting front and rear sides of the respective inlet valves 221a, 221b, 221c and 221d on the first and second hydraulic circuits 201 and 202, and may be provided to allow the flow of the pressurized medium from the wheel cylinders 40 to the hydraulic pressure providing unit 110 and to block the flow of the pressurized medium from the hydraulic pressure providing unit 110 to the wheel cylinders 40. The check valves 223a, 223b, 223c, and 223d may allow the hydraulic pressure of the pressurized medium applied to the wheel cylinders 40 to be rapidly released, and may allow the hydraulic pressure of the pressurized medium applied to the wheel cylinders 40 to be introduced into the hydraulic pressure providing unit 110 even when the inlet valves 221a, 221b, 221c and 221d are not operated normally.

The first and second hydraulic circuits 201 and 202 may further include a plurality of outlet valves 222 (222a, 222b, 222c and 222d) connected to the reservoir 30 for improving the performance of the wheel cylinders 40 when releasing the braking. The respective outlet valves 222 are connected to the respective wheel cylinders 40 to control the flow of the pressurized medium escaping from the wheel cylinders 40 provided on the wheels RR, RL, FR and FL. That is, the outlet valves 222 may sense the braking pressure of each of the wheels RR, RL, FR and FL and selectively open when depressurized braking is required to control the depressurization of the wheel cylinders 40.

The outlet valves 222 may be provided as a normally closed type solenoid valve which operates to be opened when receiving an electrical signal from the electronic control unit in a normally closed state.

The first and second dump passages 116 and 117 may be provided with first and second dump valves 241 and 242 for controlling the flow of the pressurized medium, respectively. Referring to FIG. 1 again, the first and second dump valves 241 and 242 may be provided as check valves which allow only the flow of the pressurized medium from the reservoir 30 toward the first and second pressure chambers 112 and 113 while blocking the flow of the pressurized medium in the opposite direction. That is, the first dump valve 241 may allow the flow of the pressurized medium from the reservoir 30 to the first pressure chamber 112 while blocking the flow of the pressurized medium from the first pressure chamber 112 to the reservoir 30, and the second dump valve 242 may allow the flow of the pressurized medium from the reservoir 30 to the second pressure chamber 113 while blocking the flow of the pressurized medium from the second pressure chamber 113 to the reservoir 30.

The second dump passage 117 may be provided with a bypass passage connected in parallel to the second dump valve 242. Specifically, the bypass passage may be provided to bypass the front and rear of the second dump valve 242 on the second dump passage 117, and may be provided with a third dump valve 243 for controlling the flow of the pressurized medium between the second pressure chamber 113 and the reservoir 30.

The third dump valve 243 may be provided as a bidirectional valve for controlling the flow of the pressurized medium between the second pressure chamber 113 and the reservoir 30. The third dump valve 243 may be provided as a normally open type solenoid valve which operates to be closed when receiving an electrical signal from the electronic control unit in a normally open state.

The hydraulic pressure providing unit 110 of the electronic brake system 1 according to an embodiment of the present disclosure may operate in a double acting manner.

Specifically, the hydraulic pressure generated in the first pressure chamber 112 as the hydraulic piston 114 moves forward may be transmitted to the first hydraulic circuit 201 through the first hydraulic passage 211, the second hydraulic passage 212, the eighth hydraulic passage 218, and the seventh hydraulic passage 217 to perform the braking of the wheel cylinders 40 installed on the front right wheel FR and the rear left wheel RL, and may be transmitted to the second hydraulic circuit 202 through the first hydraulic passage 211, the third hydraulic passage 213, the eighth hydraulic passage 218, and the seventh hydraulic passage 217 to perform the braking of the wheel cylinders 40 installed on the rear right wheel RR and the front left wheel FL.

Likewise, the hydraulic pressure generated in the second pressure chamber 113 as the hydraulic piston 114 moves backward may be transmitted to the first hydraulic circuit 201 through the fourth hydraulic passage 214, the fifth and sixth hydraulic passages 215 and 216, and the seventh hydraulic passage 217 to perform the braking of the wheel cylinders 40 installed on the front right wheel FR and the rear left wheel RL, and may be transmitted to the second hydraulic circuit 202 similarly through the fourth hydraulic passage 214, the fifth and sixth hydraulic passages 215 and 216, and the seventh hydraulic passage 217 to perform the braking of the wheel cylinders 40 installed on the rear right wheel RR and the front left wheel FL.

Further, the negative pressure generated in the first pressure chamber 112 as the hydraulic piston 114 moves backward may cause the pressurized medium of the wheel cylinders 40 installed on the front right wheel FR and the rear left wheel RL to be sucked and cause the sucked pressurized medium to be returned to the first pressure chamber 112 from the first hydraulic circuit 201 through the second hydraulic passage 212, the seventh and eighth hydraulic passages 217 and 218, and the first hydraulic passage 211, and may cause the pressurized medium of the wheel cylinders 40 installed on the rear right wheel RR and the front left wheel FL to be sucked and cause the sucked pressurized medium to be returned to the first pressure chamber 112 from the second hydraulic circuit 202 through the third hydraulic passage 213, the seventh and eighth hydraulic passages 217 and 218, and the first hydraulic passage 211.

The electronic brake system 1 according to an embodiment of the present disclosure may include the first and second backup passages 251 and 252 so that the pressurized medium discharged from the master cylinder 20 is directly supplied to the wheel cylinders 40 to perform the braking in a case where the normal operation is impossible due to a failure of an apparatus or the like.

The first backup passage 251 may be provided to connect the first hydraulic port 24a of the master cylinder 20 and the first hydraulic circuit 201, and the second backup passage 252 may be provided to connect the second hydraulic port 24b of the master cylinder 20 and the second hydraulic circuit 202. Specifically, the first backup passage 251 may be connected so as to join a front side of the first and second inlet valves 221a and 221b on the first hydraulic circuit 201, and the second backup passage 252 may be connected so as to join a front side of the third and fourth inlet valves 221c and 221d on the second hydraulic circuit 202.

The first backup passage 251 may be provided with a first cut valve 261 for controlling the flow of the pressurized medium, and the second backup passage 252 may be provided with a second cut valve 262 for controlling the flow of the pressurized medium. The first and second cut valves 261 and 262 may be provided as normally open type solenoid valves which operate to be closed when receiving a closing signal from the electronic control unit in a normally open state.

Accordingly, when the first and second cut valves 261 and 262 are closed, the hydraulic pressure provided from the hydraulic pressure supply apparatus 100 may be supplied to the wheel cylinders 40 through the first and second hydraulic circuits 201 and 202, and when the first and second cut valves 261 and 262 are opened, the hydraulic pressure provided from the master cylinder 20 may be supplied to the wheel cylinders 40 through the first and second dump valves 241 and 242. At this time, since the plurality of inlet valves 221a. 221b, 221c and 221d are opened, the operation state thereof does not need to be switched.

Further, the electronic brake system 1 according to an embodiment of the present disclosure may include a backup passage pressure sensor PS1 for sensing the hydraulic pressure in the master cylinder 20, and passage pressure sensors PS21 and PS22 for sensing the hydraulic pressure in at least one of the first hydraulic circuit 201 and the second hydraulic circuit 202. For example, the backup passage pressure sensor PS1 may be provided at a front side of the first cut valve 261 on the first backup passage 251 to sense the hydraulic pressure generated from the master cylinder 20, and the passage pressure sensors PS21 and PS22 may be provided at a front side of the inlet valves 221 of at least one of the first hydraulic circuit 201 and the second hydraulic circuit 202 to sense the hydraulic pressure applied to the first hydraulic circuit 201 and the second hydraulic circuit 202. Although the drawing shows that the passage pressure sensors PS21 and PS22 are provided in the first hydraulic circuit 201 and the second hydraulic circuit 202, the present disclosure is not limited thereto. That is, one or more passage pressure sensors may be provided as long as hydraulic pressure applied to the first and second hydraulic circuits 201 and 202 can be sensed.

Hereinafter, the operation of the electronic brake system 1 according to an embodiment of the present disclosure will be described.

In the electronic brake system 1 according to an embodiment of the present disclosure, the hydraulic pressure supply apparatus 100 may be used in a low-pressure mode and a high-pressure mode. The low-pressure mode and the high-pressure mode may be changed by changing the operation of the hydraulic control unit 200. The hydraulic pressure supply apparatus 100 may provide a high hydraulic pressure without increasing the output of the motor 120 by using the high-pressure mode and further reduce the load applied to the motor 120. Accordingly, a stable braking force may be secured while reducing the cost and weight of the brake system, and the durability and operational reliability of the apparatuses may be improved.

When the hydraulic piston 114 is advanced by the driving of the motor 120, a hydraulic pressure is generated in the first pressure chamber 112. As the hydraulic piston 114 advances in the initial position, that is, as the operating stroke of the hydraulic piston 114 increases, the supply amount of the pressurized medium transmitted from the first pressure chamber 112 to the wheel cylinders 40 increases, and the braking pressure rises accordingly. However, since the hydraulic piston 114 has an effective stroke, there is a maximum pressure due to advancement of the hydraulic piston 114.

In this case, the maximum pressure in the low-pressure mode is smaller than the maximum pressure in the high-pressure mode. However, the rate of pressure increase per stroke of the hydraulic piston 114 is smaller in the high-pressure mode than in the low-pressure mode. This is because the entire pressurized medium discharged from the first pressure chamber 112 is not transmitted to the wheel cylinders 40 but a part of the pressurized medium is transmitted to the second pressure chamber 113. This will be described later with reference to FIG. 3.

Accordingly, in the early period of braking where braking responsiveness is important, the low-pressure mode in which the rate of pressure increase per stroke is large may be used, and in the late period of braking where the maximum braking force is important, the high-pressure mode in which the maximum pressure is large may be used.

Figure 2:
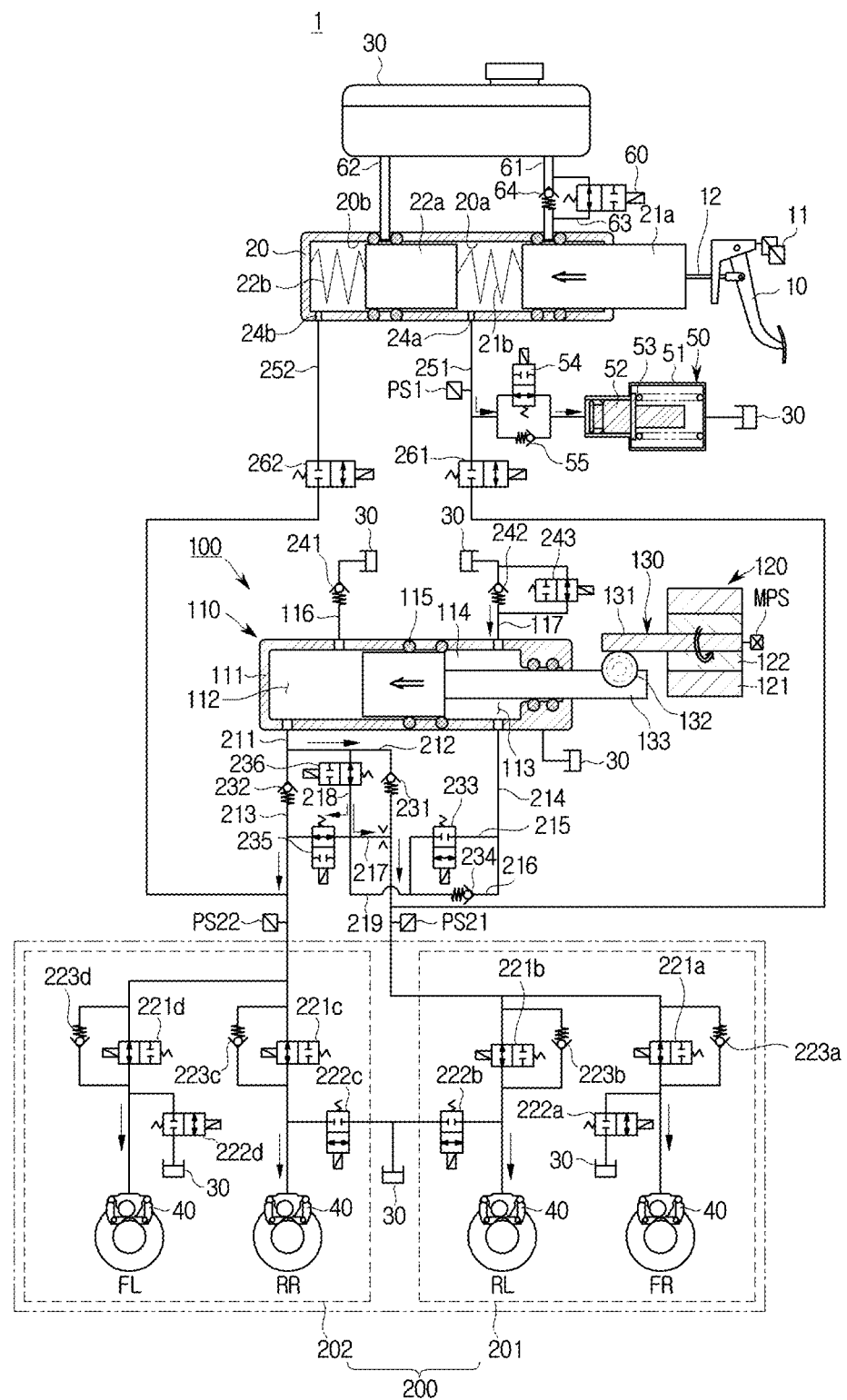
FIG. 2 is a hydraulic circuit diagram illustrating a state in which a hydraulic piston of an electronic brake system according to an embodiment of the present disclosure moves forward to provide a braking pressure in a low-pressure mode.
Figure 3:
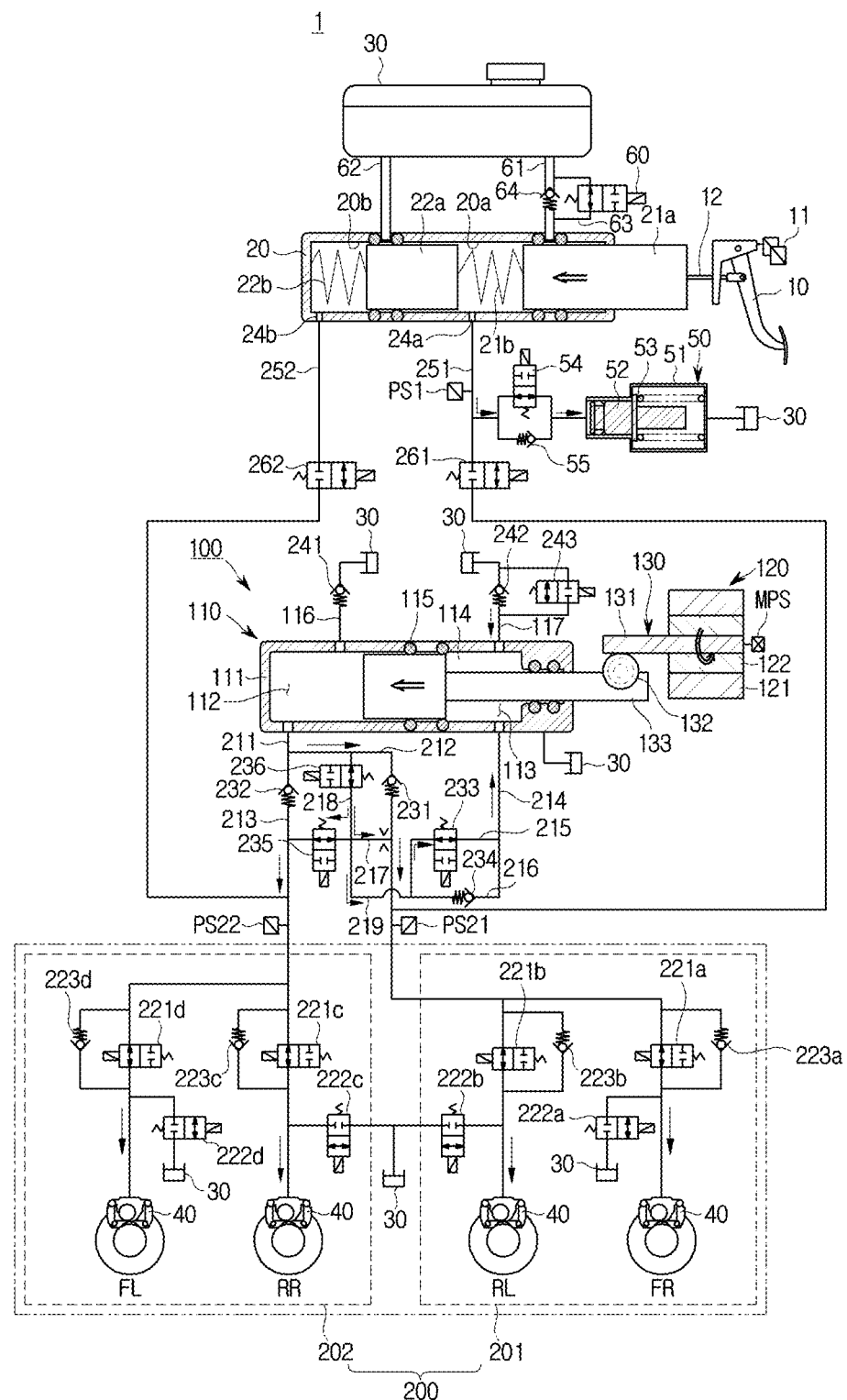
FIG. 3 is a hydraulic circuit diagram illustrating a state in which a hydraulic piston of an electronic brake system according to an embodiment of the present disclosure moves forward to provide a braking pressure in a high-pressure mode.

FIG. 2 is a hydraulic circuit diagram illustrating a state in which the hydraulic piston of the electronic brake system according to an embodiment of the present disclosure moves forward to provide a braking pressure in the low-pressure mode, and FIG. 3 is a hydraulic circuit diagram illustrating a state in which the hydraulic piston of the electronic brake system according to an embodiment of the present disclosure moves forward to provide a braking pressure in the high-pressure mode.

Referring to FIG. 2, when the driver depresses the brake pedal 10 at the beginning of braking, the motor 120 is operated to rotate in one direction, the rotational force of the motor 120 is transmitted to the hydraulic pressure providing unit 110 by the power converting unit 130, and the hydraulic piston 114 of the hydraulic pressure providing unit 110 advances to generate a hydraulic pressure in the first pressure chamber 112. The hydraulic pressure discharged from the first pressure chamber 112 is transmitted to the wheel cylinders 40 provided on the four wheels through the first hydraulic circuit 201 and the second hydraulic circuit 202 to generate a braking force.

Specifically, the hydraulic pressure provided from the first pressure chamber 112 is directly transmitted to the wheel cylinders 40 provided on the two wheels FR and RL through the first hydraulic passage 211 and the second hydraulic passage 212 connected to the first communication hole 111a. At this time, the first and second inlet valves 221a and 221b, which are respectively installed on the two hydraulic passages branched from the first hydraulic circuit 201, are provided in an opened state, and the first and second outlet valves 222a and 222b, which are installed on the two hydraulic passages respectively branched from the two hydraulic passages branched from the first hydraulic circuit 201, are maintained in a closed state, thereby preventing the hydraulic pressure from leaking to the reservoir 30.

Also, the hydraulic pressure provided from the first pressure chamber 112 is directly transmitted to the wheel cylinders 40 provided on the two wheels RR and FL through the first hydraulic passage 211 and the third hydraulic passage 213 connected to the first communication hole 111a. At this time, the third and fourth inlet valves 221c and 221d, which are respectively installed on the two hydraulic passages branched from the second hydraulic circuit 202, are provided in an opened state, and the third and fourth outlet valves 222c and 222d, which are installed on the two hydraulic passages respectively branched from the two hydraulic passages branched from the second hydraulic circuit 202, are maintained in a closed state, thereby preventing the hydraulic pressure from leaking to the reservoir 30.

Further, the fifth valve 235 and the sixth valve 236 may be switched to an opened state to open the seventh hydraulic passage 217 and the eighth hydraulic passage 218. As the seventh hydraulic passage 217 and the eighth hydraulic passage 218 are opened, the hydraulic pressure provided from the first pressure chamber 112 passes through the first hydraulic passage 211, the second hydraulic passage 212, the eighth hydraulic passage 218 and the seventh hydraulic passage 217 in order, and then passes through the second hydraulic passage 212 and the third hydraulic passage 213, and finally may be transmitted to the first hydraulic circuit 201 and the second hydraulic circuit 202. However, at least one of the fifth valve 235 and the sixth valve 236 may be maintained in a closed state according to the need for the control.

At this time, the third valve 233 may be maintained in a closed state to block the fifth hydraulic passage 215. Thereby, it is possible to prevent the hydraulic pressure generated in the first pressure chamber 112 from being transmitted to the second pressure chamber 113 through the fifth hydraulic passage 215, thereby improving the rate of pressure increase per stroke of the hydraulic piston 114. Therefore, a quick braking response at the beginning of braking may be achieved.

Further, when the hydraulic pressure of the pressurized medium is generated by the hydraulic pressure supply device 100, the first and second cut valves 261 and 262 provided on the first and second backup passages 251 and 252 are closed to prevent the hydraulic pressure discharged from the master cylinder 20 from being transmitted to the wheel cylinders 40. The hydraulic pressure generated in the master cylinder 20 by the pressing force of the brake pedal 10 is transmitted to the simulation apparatus 50 connected to the master cylinder 20. At this time, the simulator valve 54 provided at the front side of the simulation chamber 51 is opened so that the hydraulic pressure discharged from the first master chamber 20a of the master cylinder 20 is transmitted to the front of the reaction force piston 52 provided in the simulation chamber 51 through the simulator valve 54. Thereby, the reaction force piston 52 moves to compress the reaction force spring 53, and a reaction force corresponding to the pressing force of the brake pedal 10 acts on the brake pedal 10 by the elastic restoring force of the reaction force spring 53, so that a proper pedal feeling may be provided to the driver.

The passage pressure sensors PS21 and PS22 that sense the hydraulic pressure in at least one of the first hydraulic circuit 201 and the second hydraulic circuit 202 may sense the hydraulic pressure transmitted to the wheel cylinders 40, and control the operation of the hydraulic pressure supply apparatus 100 based on the sensed hydraulic pressure to thereby control the flow rate or the hydraulic pressure of the pressurized medium transmitted to the wheel cylinders 40. Also, when the hydraulic pressure transmitted to the wheel cylinders 40 is higher than a target pressure value corresponding to the pressing force of the brake pedal 10, at least one of the first to fourth outlet valves 222a to 222d is opened and the hydraulic pressure may be controlled so as to correspond to the target pressure value.

The hydraulic pressure supply apparatus 100 of the electronic brake system 1 according to an embodiment of the present disclosure may switch from the low-pressure mode shown in FIG. 2 to the high-pressure mode shown in FIG. 3 before the hydraulic piston 114 advances to the maximum.

Referring to FIG. 3, if the hydraulic pressure sensed by the passage pressure sensors PS21 and PS22 is higher than a preset pressure level, the electronic control unit may switch from the low-pressure mode to the high-pressure mode. In the high-pressure mode, the third valve 233 may be switched to be in an opened state to open the fifth hydraulic passage 215. Thereby, a part of the hydraulic pressure generated in the first pressure chamber 112 passes through the first hydraulic passage 211, the second hydraulic passage 212, the eighth hydraulic passage 218, and the fifth hydraulic passage 215 in order and is transferred to the second pressure chamber 113, so that the hydraulic pressure piston 114 may be further advanced and the load applied to the motor 120 may be reduced.

Since a part of the pressurized medium discharged from the first pressure chamber 112 flows into the second pressure chamber 113 in the high-pressure mode, the rate of pressure increase per stroke decreases. However, since a part of the hydraulic pressure generated in the first pressure chamber 112 is utilized to further advance the hydraulic piston 114, the maximum pressure of the pressurized medium may increase. This is because the rate of volume change per stroke of the hydraulic piston 114 is relatively smaller in the second pressure chamber 113 than in the first pressure chamber 112 as the drive shaft 133 passes through the second pressure chamber 113.

Also, since the hydraulic pressure in the first pressure chamber 112 increases as the hydraulic piston 114 advances, a force to move the hydraulic piston 114 backward by the hydraulic pressure of the first pressure chamber 112 increases, and thus the load applied to the motor 120 also increases. However, since a part of the pressurized medium discharged from the first pressure chamber 112 is transmitted to the second pressure chamber 113 by opening the fifth hydraulic passage 215 by the control of the third valve 233, a hydraulic pressure is also formed in the second pressure chamber 113 so that the load applied to the motor 120 may be reduced.

At this time, the third dump valve 243 may be switched to the closed state. By closing the third dump valve 243, the pressurized medium in the first pressure chamber 112 may be rapidly introduced into the second pressure chamber 113 in the negative pressure state, and a hydraulic pressure may be applied to the second pressure chamber 113 as well. However, if necessary, the third dump valve 243 may be maintained in an opened state to control the pressurized medium in the second pressure chamber 113 to flow into the reservoir 30.

Hereinafter, an operating state in which the hydraulic piston 114 moves backward to provide the braking pressure to the wheel cylinders 40 will be described.

Figure 4:
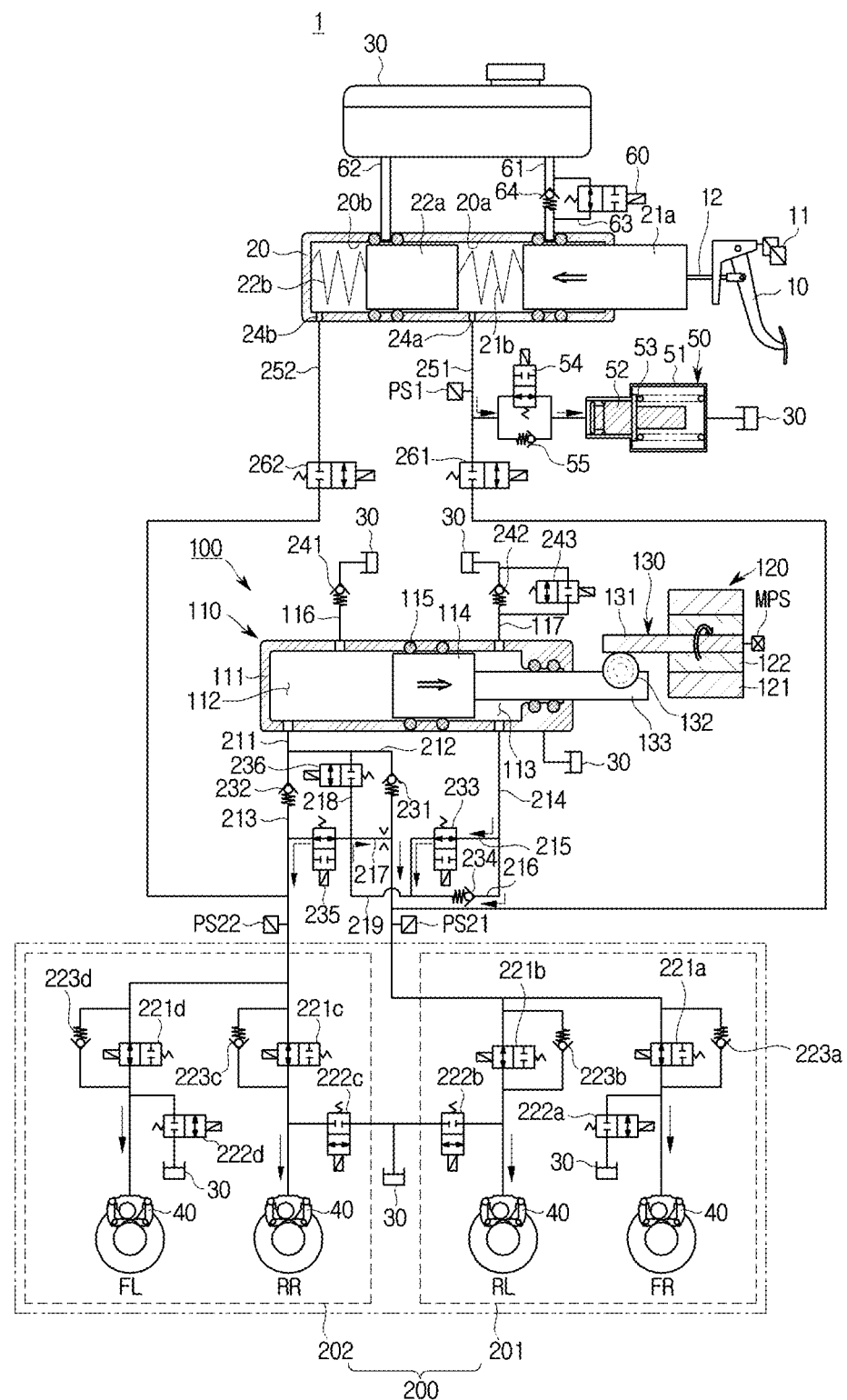
FIG. 4 is a hydraulic circuit diagram illustrating a state in which a hydraulic piston of an electronic brake system according to an embodiment of the present disclosure moves backward to provide a braking pressure.

FIG. 4 is a hydraulic circuit diagram illustrating a state in which a hydraulic piston of an electronic brake system according to an embodiment of the present disclosure moves backward to provide a braking pressure. Referring to FIG. 4, when the driver depresses the brake pedal 10 at the beginning of braking, the motor 120 is operated to rotate in the opposite direction, the rotational force of the motor 120 is transmitted to the hydraulic pressure providing unit 110 by the power converting unit 130, and the hydraulic piston 114 of the hydraulic pressure providing unit 110 moves backward to generate the hydraulic pressure in the second pressure chamber 113.

The hydraulic pressure discharged from the second pressure chamber 113 is transmitted to the wheel cylinders 40 provided on the four wheels through the first hydraulic circuit 201 and the second hydraulic circuit 202 to generate a braking force.

Specifically, the hydraulic pressure provided by the second pressure chamber 113 passes through the fourth hydraulic passage 214 connected to the second communication hole 111b, the opened fifth hydraulic passage 215, and the sixth hydraulic passage 216, and is directly transmitted to the wheel cylinders 40 provided on the two wheels FR and RL through the orifice-side passage of the opened seventh hydraulic passage 217 and the second hydraulic passage 212. At this time, the first and second inlet valves 221a and 221b are provided in an opened state, and the first and second outlet valves 222a and 222b are maintained in a closed state to prevent the hydraulic pressure from leaking to the reservoir 30.

Also, the hydraulic pressure provided by the second pressure chamber 113 passes through the fourth hydraulic passage 214 connected to the second communication hole 111b, the opened fifth hydraulic passage 215, and the sixth hydraulic passage 216, and is directly transmitted to the wheel cylinders 40 provided on the two wheels FR and FL through the passage on the fourth valve 234 side of the opened seventh hydraulic passage 217 and the third hydraulic passage 213. At this time, the third and fourth inlet valves 221c and 221d are provided in an opened state, and the third and fourth outlet valves 222c and 222d are maintained in a closed state to prevent the hydraulic pressure from leaking to the reservoir 30.

At this time, the third valve 233 is switched to the opened state to open the fifth hydraulic passage 215, and the sixth hydraulic passage 216 is also opened since the fourth valve 234 is provided as a check valve that allows the pressurized medium to flow from the second pressure chamber 113 toward the wheel cylinders 40.

Also, the sixth valve 236 may be maintained in the closed state to block the eighth hydraulic passage 218. Accordingly, it is possible to prevent the hydraulic pressure generated in the second pressure chamber 113 from being transmitted to the first pressure chamber 112 through the eighth hydraulic passage 218, thereby improving the rate of pressure increase per stroke of the hydraulic piston 114. Therefore, a quick braking response at the beginning of braking may be achieved.

The third dump valve 243 may be switched to the closed state. By closing the third dump valve 243, the hydraulic pressure of the pressurized medium may be generated quickly and stably in the second pressure chamber 113, and the hydraulic pressure generated in the second pressure chamber 113 may be discharged only to the fourth hydraulic passage 214.

Hereinafter, the operation of releasing the braking pressure in the normal operating state of the electronic brake system 1 according to an embodiment of the present disclosure will be described.

Figure 5:
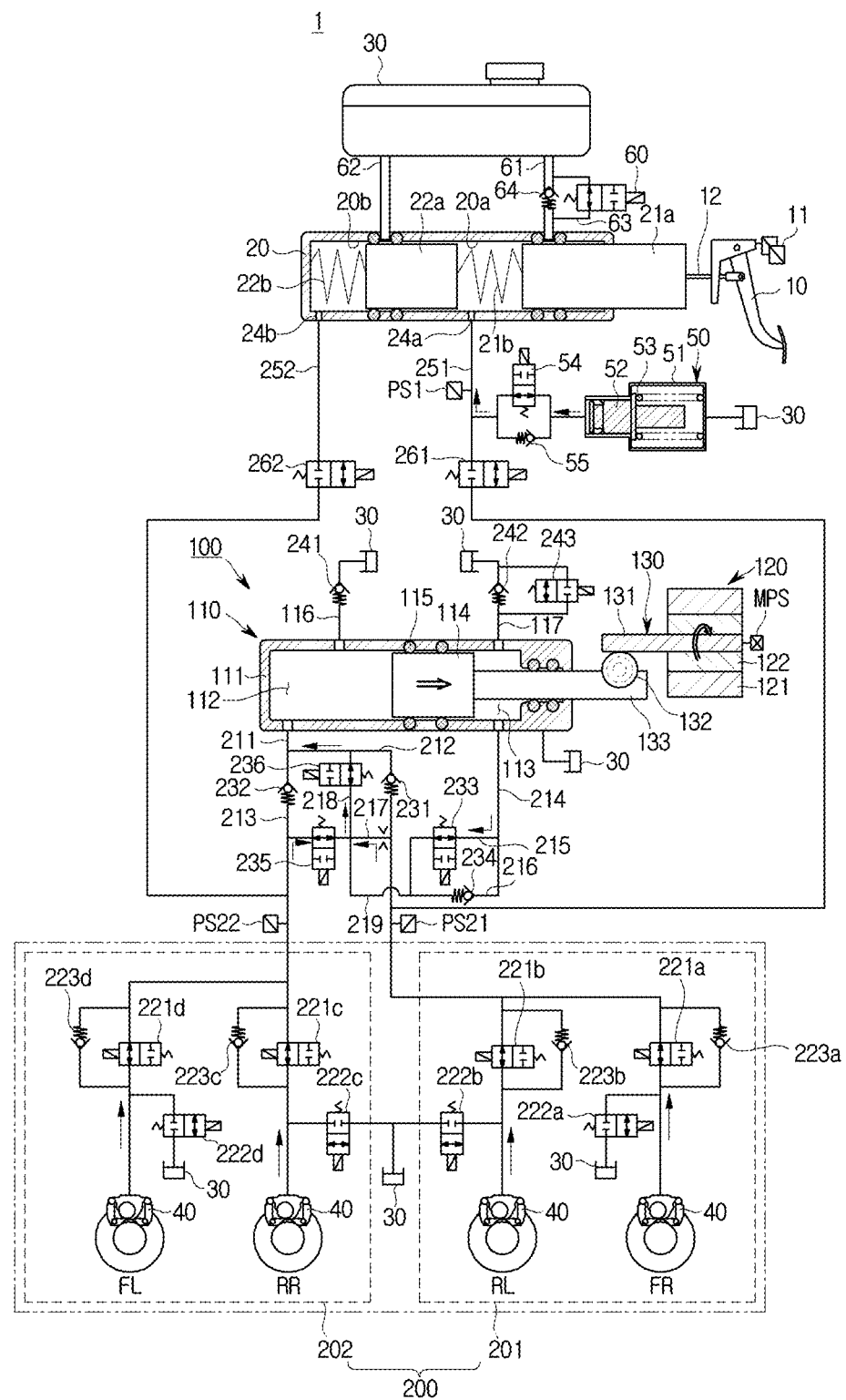
FIG. 5 is a hydraulic circuit diagram illustrating a state in which a hydraulic piston of an electronic brake system according to an embodiment of the present disclosure moves backward to release the braking pressure in a high-pressure mode.
Figure 6:
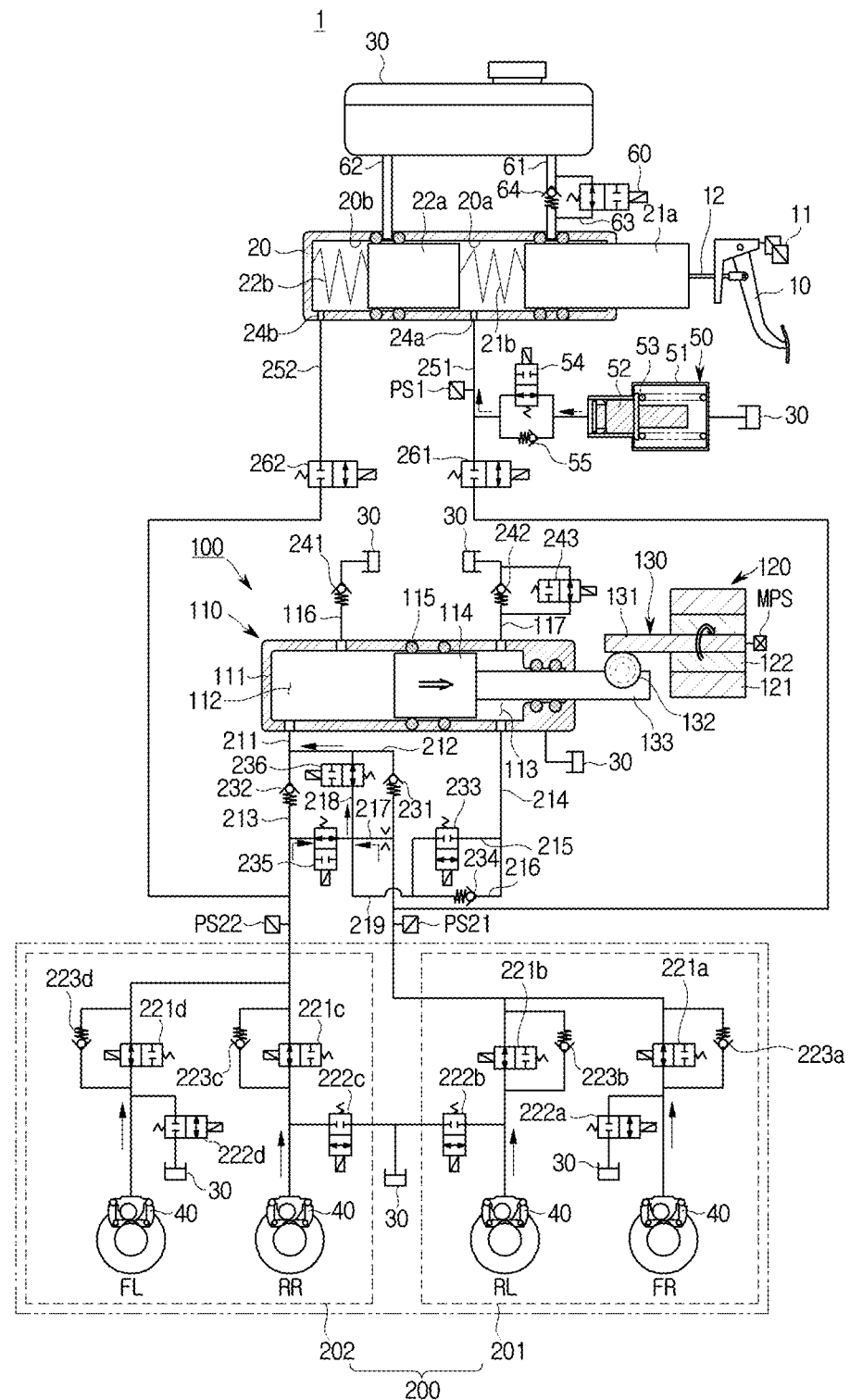
FIG. 6 is a hydraulic circuit diagram illustrating a state in which a hydraulic piston of an electronic brake system according to an embodiment of the present disclosure moves backward to release the braking pressure in a low-pressure mode.

FIG. 5 is a hydraulic circuit diagram illustrating a state in which the hydraulic piston of the electronic brake system according to an embodiment of the present disclosure moves backward to release the braking pressure in the high-pressure mode, and FIG. 6 is a hydraulic circuit diagram illustrating a state in which the hydraulic piston of the electronic brake system according to an embodiment of the present disclosure moves backward to release the braking pressure in the low-pressure mode.

Referring to FIG. 5, when the pressing force applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 rotate in the direction opposite to the braking direction to move the hydraulic piston 114 backward to its original position. Thereby, the hydraulic pressure in the first pressure chamber 112 may be released and a negative pressure may be generated. At the same time, the pressurized medium discharged from the wheel cylinders 40 is transmitted to the first pressure chamber 112 through the first and second hydraulic circuits 201 and 202.

Specifically, the negative pressure generated in the first pressure chamber 112 releases the pressure in the wheel cylinders 40 provided on the two wheels FR and RL through the first hydraulic passage 211 connected to the first communication hole 111a, the second hydraulic passage 212, the seventh hydraulic passage 217 communicating the first hydraulic passage 211 and the second hydraulic passage 212, and the eighth hydraulic passage 218. At this time, the first and second inlet valves 221a and 221b installed on the two hydraulic passages branched from the first hydraulic circuit 201 are maintained in the opened state, and the first and second outlet valves 222a and 222b installed on the two hydraulic passages branched from the first hydraulic circuit 201 are maintained in the closed state, thereby preventing the pressurized medium in the reservoir 30 from flowing into the first pressure chamber 112.

Also, the negative pressure generated in the first pressure chamber 112 releases the pressure in the wheel cylinders 40 provided on the two wheels FL and RR through the first hydraulic passage 211 connected to the first communication hole 111a, the third hydraulic passage 213, the seventh hydraulic passage 217 communicating with the first hydraulic passage 211 and the third hydraulic passage 213, the eighth hydraulic passage 218, and the second hydraulic passage 212. At this time, the third and fourth inlet valves 221c and 221d installed on the two hydraulic passages branched from the second hydraulic circuit 202 are maintained in the opened state, and the third and fourth outlet valves 222c and 222d installed on the two hydraulic passages branched from the second hydraulic circuit 202 are maintained in the closed state, thereby preventing the pressurized medium in the reservoir 30 from flowing into the first pressure chamber 112.

Meanwhile, the third valve 233 is switched to the opened state to open the fifth hydraulic passage 215, and the sixth valve 236 is switched to the opened state to open the eighth hydraulic passage 218 as well, to thereby communicate with the first pressure chamber 112 and the second pressure chamber 113.

That is, the hydraulic piston 114 must be moved backward in order to form a negative pressure in the first pressure chamber 112, but when there is a hydraulic pressure of the pressurized medium in the second pressure chamber 113, resistance is generated in the backward movement of the hydraulic piston 114. Accordingly, by switching the third valve 233 and the sixth valve 236 to the opened state to communicate with the first pressure chamber 112 and the second pressure chamber 113, the pressurizing medium in the second pressure chamber 113 may be supplied to the first pressure chamber 112.

At this time, the third dump valve 243 may be switched to the closed state. By closing the third dump valve 243, the pressurized medium in the second pressure chamber 113 may be discharged only to the fourth hydraulic passage 214. However, if necessary, the third dump valve 243 may be maintained in the opened state to control the pressurized medium in the second pressure chamber 113 to flow into the reservoir 30.

When the negative pressure transmitted to the first and second hydraulic circuits 201 and 202 is measured to be higher than a target pressure release value corresponding to the release amount of the brake pedal 10, the negative pressure may be controlled to correspond to the target pressure value by opening at least one of the first to fourth outlet valves 222a to 222d. In addition, the negative pressure formed in the master cylinder 20 may be controlled so as not to be transmitted to the hydraulic control unit 200 by closing the first and second cut valves 261 and 262 provided on the first and second backup passages 251 and 252.

In the operating state of the high-pressure mode shown in FIG. 5, not only the pressurized medium in the wheel cylinders 40 but also the pressurized medium in the second pressure chamber 113 is supplied to the first pressure chamber 112 by the negative pressure in the first pressure chamber 112 generated while the hydraulic piston 114 is moving backward, and thus the rate of pressure decrease of the wheel cylinders 40 is small. Therefore, it may be difficult to release the braking pressure quickly in the high-pressure mode. For this reason, the braking pressure release operation in the high-pressure mode may be used only in a high-pressure condition of the braking pressure, and when the braking pressure is lower than a certain level, the braking pressure releasing operation may be switched to the low-pressure mode shown in FIG. 6 in order to release the braking pressure promptly.

Referring to FIG. 6, when the braking pressure is released in the low-pressure mode, the third dump valve 243 is switched to or maintained in the opened state to communicate with the second pressure chamber 113 and the reservoir 30, instead of maintaining the third valve 233 in the closed state or switching the third valve 233 to the closed state to close the fifth hydraulic passage 215.

When the braking pressure is released in the low-pressure mode, the negative pressure generated in the first pressure chamber 112 is used only for recovering the pressure medium in the wheel cylinders 40. Accordingly, in the case of releasing the braking pressure in the low-pressure mode, the rate of pressure decrease per stroke of the hydraulic piston 114 increases as compared with the case where the braking pressure is released in the high-pressure mode. At this time, as the third dump valve 243 is switched to the opened state, the hydraulic pressure generated in the second pressure chamber 113 by the backward movement of the hydraulic piston 114 is mostly transmitted to the reservoir 30 at atmospheric pressure rather than passing through the fourth valve 234.

Unlike what is shown in FIG. 6, the braking pressure in the wheel cylinders 40 may be released even when the hydraulic piston 114 moves forward.

Figure 7:
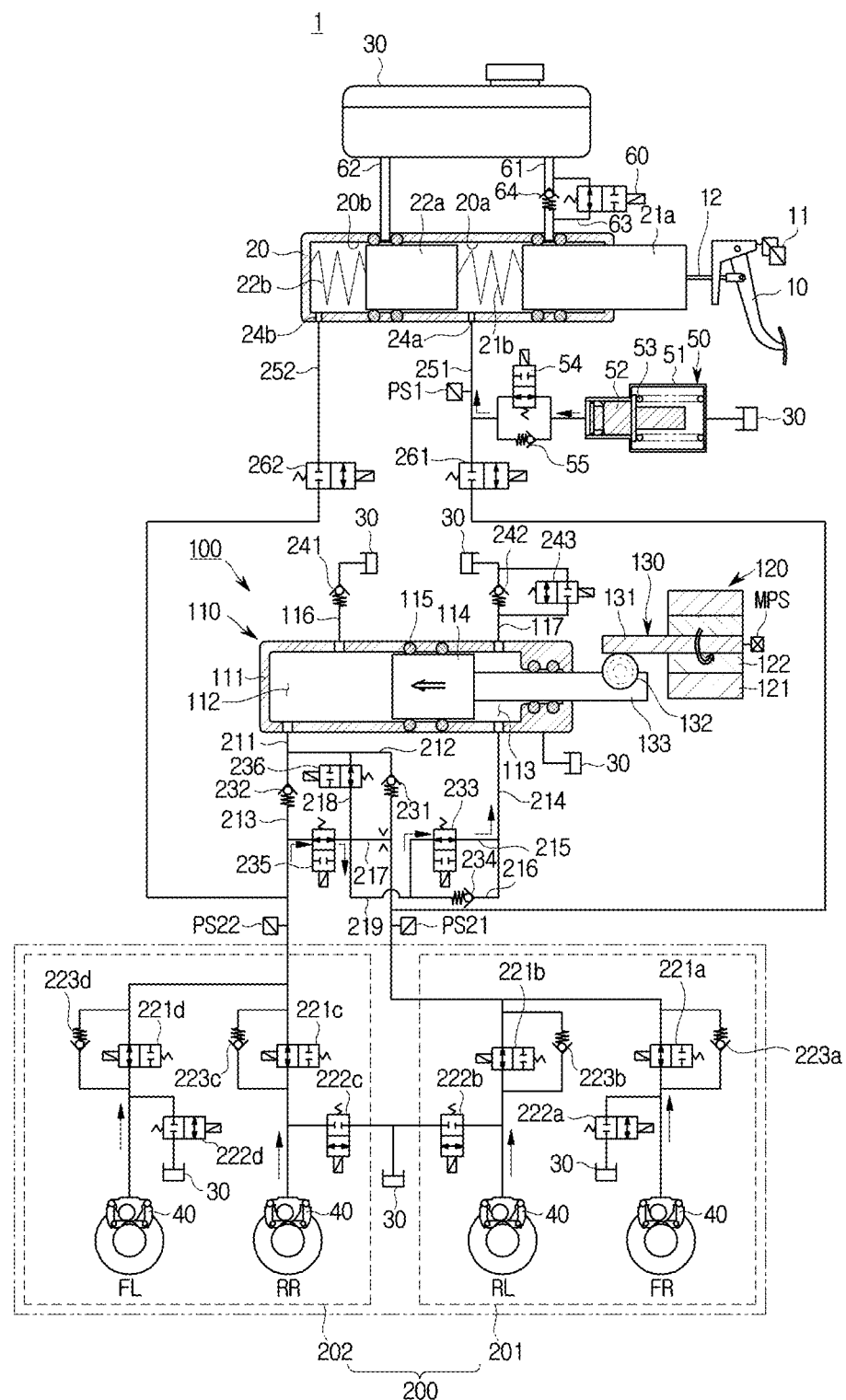
FIG. 7 is a hydraulic circuit diagram illustrating a state in which a hydraulic piston of an electronic brake system according to an embodiment of the present disclosure moves forward to release the braking pressure.

FIG. 7 is a hydraulic circuit diagram illustrating a state in which the hydraulic piston of the electronic brake system according to an embodiment of the present disclosure moves forward to release the braking pressure.

Referring to FIG. 7, when the pressing force applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 rotate in the direction opposite to the braking direction to move the hydraulic piston 114 forward to its original position. Thereby, the hydraulic pressure in the second pressure chamber 113 is released and a negative pressure is generated. At the same time, the pressurized medium discharged from the wheel cylinders 40 is transmitted to the second pressure chamber 113 through the first and second hydraulic circuits 201 and 202.

Specifically, the negative pressure generated in the second pressure chamber 113 releases the pressure in the wheel cylinders 40 provided on the two wheels FR and RL through the fourth hydraulic passage 214 connected to the second communication hole 111b, the fifth hydraulic passage 215, the orifice-side passage on the seventh hydraulic passage 217, and the second hydraulic passage 212. At this time, the first and second inlet valves 221a and 221b installed on the two hydraulic passages branched from the first hydraulic circuit 201 are maintained in the opened state, and the first and second outlet valves 222a and 222b installed on the two hydraulic passages branched from the first hydraulic circuit 201 are maintained in the closed state, thereby preventing the pressurized medium in the reservoir 30 from flowing into the second pressure chamber 113.

Also, the negative pressure generated in the second pressure chamber 113 releases the pressure in the wheel cylinders 40 provided on the two wheels FL and RR through the fourth hydraulic passage 214 connected to the second communication hole 111b, the fifth hydraulic passage 215, the seventh hydraulic passage 217, and the third hydraulic passage 213. At this time, the third and fourth inlet valves 221c and 221d installed on the two hydraulic passages branched from the second hydraulic circuit 202 are maintained in the opened state, and the third and fourth outlet valves 222c and 222d installed on the two hydraulic passages branched from the second hydraulic circuit 202 are maintained in the closed state, thereby preventing the pressurized medium in the reservoir 30 from flowing into the second pressure chamber 113.

At this time, the third valve 233 may be switched to the opened state to open the fifth hydraulic passage 215, and the fifth valve 235 may also be controlled to be switched to the opened state to open the seventh hydraulic passage 217.

Also, the third valve 233 may be switched to the closed state, and thereby, the negative pressure formed in the second pressure chamber 113 may quickly recover the pressurized medium in the wheel cylinders 40.

When the negative pressure transmitted to the first and second hydraulic circuits 201 and 202 is measured to be higher than the target pressure release value corresponding to the release amount of the brake pedal 10, the negative pressure may be controlled to correspond to the target pressure value by opening at least one of the first to fourth outlet valves 222a to 222d. In addition, the negative pressure formed in the master cylinder 20 may be controlled so as not to be transmitted to the hydraulic control unit 200 by closing the first and second cut valves 261 and 262 provided on the first and second backup passages 251 and 252.

Hereinafter, an operation state will be described in the case where the electronic brake system 1 according to an embodiment of the present disclosure does not operate normally.

Figure 8:
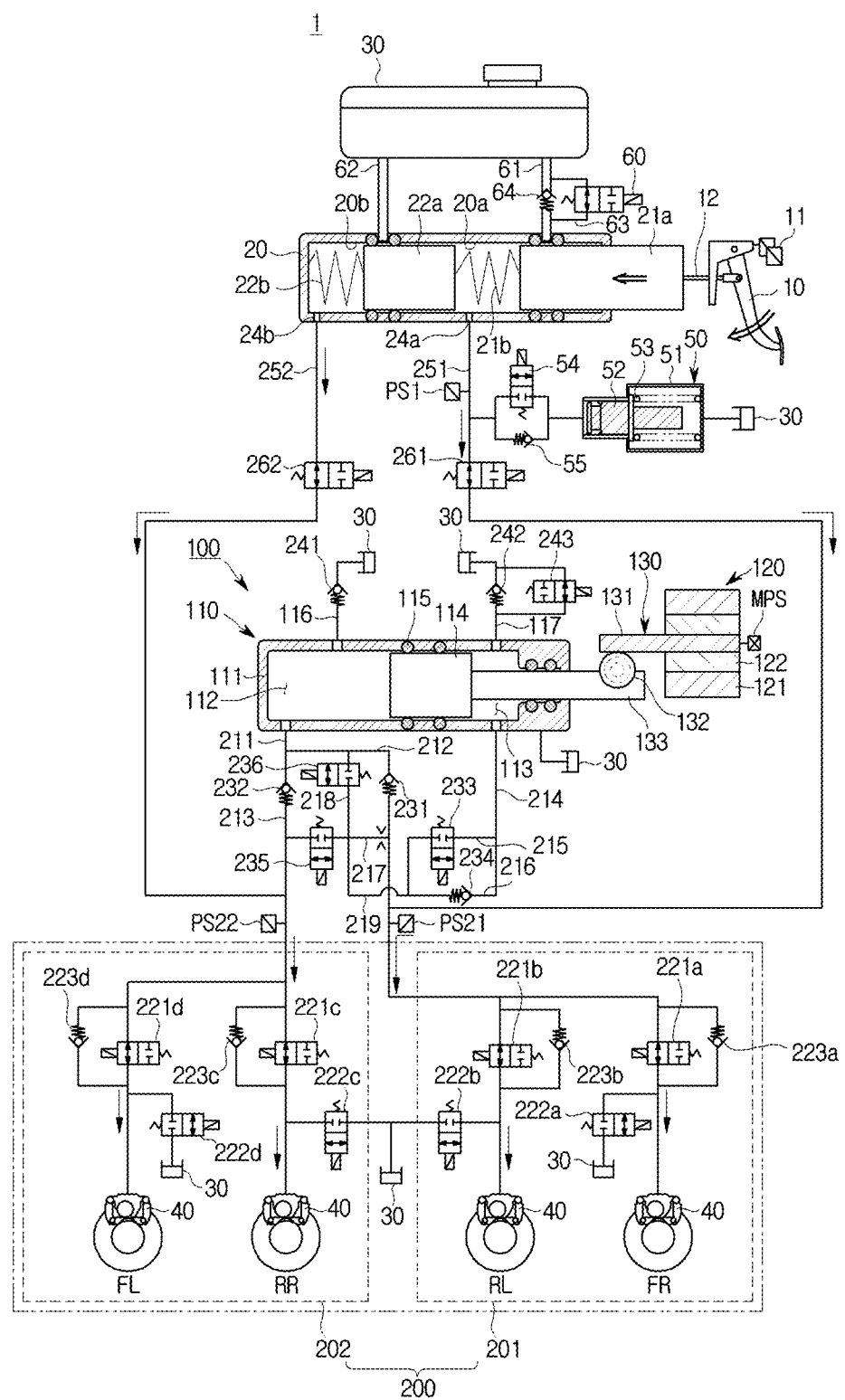
FIG. 8 is a hydraulic circuit diagram illustrating a state in which an electronic brake system according to an embodiment of the present disclosure operates abnormally.

FIG. 8 is a hydraulic circuit diagram illustrating a state in which an electronic brake system according to an embodiment of the present disclosure operates abnormally.

Referring to FIG. 8, when the electronic brake system 1 does not operate normally, each of the valves is controlled to be in a braking initial state that is in a non-operating state. Thereafter, when the driver presses the brake pedal 10, the first piston 21a connected to the brake pedal 10 moves forward and the second piston 22a also moves forward by the movement of the first piston 21a. Accordingly, a hydraulic pressure is generated from the pressurized medium accommodated in the first master chamber 20a and the second master chamber 20b, and the hydraulic pressure generated in the first and second master chambers 20a and 20b is transmitted to the wheel cylinders 40 through the first and second backup passages 251 and 252 to generate a braking force.

At this time, the first and second cut valves 261 and 262 provided on the first and second backup passages 251 and 252 and the inlet valves 221 provided on the first and second hydraulic circuits 201 and 202 are provided as a normally open type solenoid valve, and the simulator valve 54 and the outlet valves 222 are provided as normally closed type solenoid valves, and thus the hydraulic pressure generated in the first and second master chambers 20a and 20b of the master cylinder 20 may be immediately transmitted to the four wheel cylinders 40, thereby improving braking stability and performing quick braking.

Hereinafter, the operation of the electronic brake system 1 in an inspection mode according to an embodiment of the present disclosure will be described.

The inspection mode includes a mode for inspecting whether the simulator valve 54 is leaking, and a mode for inspecting whether or not air is present in the master cylinder 20.

The electronic brake system 1 according to an embodiment of the present disclosure may inspect the abnormality of the apparatuses periodically or at any time by executing the inspection mode before the start of the vehicle, during stoppage, or during drive.

Figure 9:
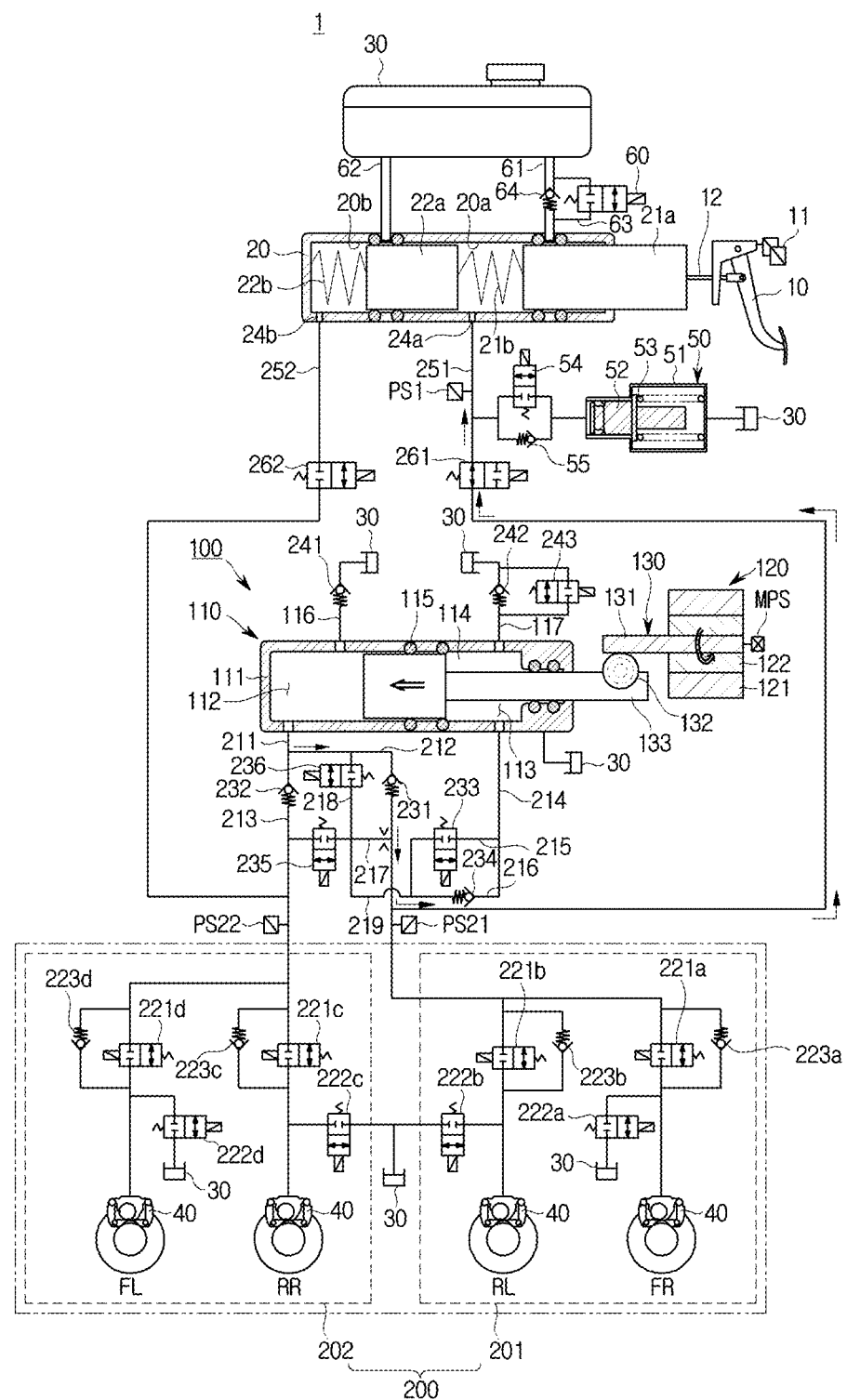
FIG. 9 is a hydraulic circuit diagram illustrating a state in which an electronic brake system according to an embodiment of the present disclosure operates in an inspection mode.

FIG. 9 is a hydraulic circuit diagram illustrating a state in which the electronic brake system 1 according to an embodiment of the present disclosure inspects whether the master cylinder 20 or the simulator valve 54 is leaking or not, and whether air is present in the master cylinder 20 or not.

As described above, when the electronic brake system 1 operates abnormally, each of the valves are controlled to be in a braking initial state that is in a non-operating state, and the first and second cut valves 261 and 262 installed on the first and second backup passages 251 and 252, and the inlet valves 221 provided at front sides of the wheel cylinders 40 provided on the respective wheels RR, RL, FR and FL are opened, so that the hydraulic pressure may be immediately transmitted to the wheel cylinders 40.

At this time, the simulator valve 54 is provided in a closed state to prevent the hydraulic pressure transmitted to the wheel cylinders 40 through the first backup passage 251 from leaking to the reservoir 30 through the simulation apparatus 50. Therefore, by pressing the brake pedal 10 by the driver, the hydraulic pressure discharged from the master cylinder 20 is transmitted to the wheel cylinders 40 without loss, thereby ensuring stable braking.

However, when there is a leak in the master cylinder 20 or the simulator valve 54, a part of the hydraulic pressure discharged from the master cylinder 20 may be lost to the reservoir 30 through the simulator valve 54, and as a result, the braking force intended by the driver may not be generated, which may cause a problem in the braking stability of the vehicle.

The same problem may also occur when air is present in the master cylinder 20. When air is present in the master cylinder 20, a sense of pedaling that the driver feels may be lightened, and when switching to the fallback mode in a state where the driver perceives such a pedal feeling as a normal operation state, the braking performance may be deteriorated.

If the hydraulic pressure discharged from the hydraulic pressure supply apparatus 100 flows into the reservoir 30 to cause a pressure loss, it is difficult to determine whether a leak occurs in the master cylinder 20 or the simulator valve 54 or whether air is present in the master cylinder 20. Accordingly, in the inspection mode, the inspection valve 60 may be closed to constitute the hydraulic circuit connected to the hydraulic pressure supply apparatus 100 as a closed circuit. That is, the passage connecting the hydraulic pressure supply apparatus 100 and the reservoir 30 may be blocked by closing the inspection valve 60, the simulator valve 54 and the outlet valves 222 to constitute a closed circuit.

The electronic brake system 1 may provide the hydraulic pressure only to the first backup passage 251 to which the simulation apparatus 50 is connected among the first and second backup passages 251 and 252 in the inspection mode. Accordingly, the second cut valve 262 may be switched to the closed state to prevent the hydraulic pressure discharged from the hydraulic pressure supply apparatus 100 from being transmitted to the master cylinder 20 along the second backup passage 252.

Referring to FIG. 9, in the inspection mode, each of the valves of the electronic brake system 1 according to an embodiment of the present disclosure is controlled to a braking initial state that is in a non-operating state, the first to fourth inlet valves 221a, 221b, 221c and 221d and the second cut valve 262 are switched to the closed state, and the first cut valve 261 is maintained in the opened state, so that the hydraulic pressure generated by the hydraulic pressure supply apparatus 100 may be transmitted to the master cylinder 20.

The hydraulic pressure in the hydraulic pressure supply apparatus 100 may be prevented from being transmitted to the wheel cylinders 40 by controlling the inlet valve 221 in the closed state. The hydraulic pressure in the hydraulic pressure supply apparatus 100 may be prevented from being discharged along the second backup passage 252 by controlling the second cut valve 262 in the closed state, and the hydraulic pressure supplied to the master cylinder 20 may be prevented from leaking to the reservoir 30 by switching the inspection valve 60 in the closed state.

Especially, when inspecting whether air is present in the master cylinder 20 or not, the inlet valve 221 is controlled to be in the closed state to prevent the hydraulic pressure from being transmitted to the wheel cylinders 40. This is because it is preferable to minimize the interference of the hydraulic pressure by the wheel cylinders 40 because the change in hydraulic pressure caused by the presence of air in the first master chamber 20a of the master cylinder 20 is very minute.

In the inspection mode, after hydraulic pressure is generated through the hydraulic pressure supply apparatus 100, the electronic control unit may determine whether or not a leak occurs in the master cylinder 20 or the simulator valve 54 and whether or not the air is present in the master cylinder 20 by analyzing the pressure value of the master cylinder 20 measured by the backup passage pressure sensor PS1. By comparing the hydraulic pressure value of the pressurized medium which is predicted to be generated by the displacement of the hydraulic piston 114 and the internal pressure of the first master chamber 20a measured by the backup passage pressure sensor PS1, the presence or absence of leaks or air in the master cylinder 20 may be diagnosed and the presence or absence of leaks in the simulator valve 54 may be diagnosed. Specifically, by comparing the hydraulic pressure value of the first pressure chamber 112 to be calculated and predicted based on the amount of displacement of the hydraulic piston 114 or the rotation angle measured by the motor control sensor MPS and the actual hydraulic pressure value of the master cylinder 20 measured by the backup passage pressure sensor PS1, it may be determined that a leak does not occur in the master cylinder 20 and the simulator valve 54 and the air is not present in the master cylinder 20 when the two hydraulic pressure values coincide with each other. In contrast, since a part of the hydraulic pressure of the pressurized medium supplied to the first master chamber 20a is lost when the actual hydraulic pressure value of the master cylinder 20 measured by the backup passage pressure sensor PS1 is smaller than the hydraulic pressure value of the first pressure chamber 112 to be calculated and predicted based on the amount of displacement of the hydraulic piston 114 or the rotation angle measured by the motor control sensor MPS, it may be determined that there is a leak in the master cylinder 20 or the simulator valve 54 or that there is air in the master cylinder 20 and it may be notified to the driver.

The electronic brake system 1 according to an embodiment of the present disclosure may perform selective braking by separately controlling the hydraulic pressure in the respective wheel cylinders 40. As an example, when it is required to perform selective braking only for the wheel cylinder 40 on the first inlet valve 221a side among the four inlet valves 221a, 221b, 221c and 221d and on the first outlet valve 222a side, a hydraulic pressure is generated in the first pressure chamber 112 as the hydraulic piston 114 moves forward, and the first inlet valve 221a is controlled to be in the opened state and the hydraulic pressure transmitted to the first hydraulic circuit 201 through the hydraulic passages and the valve is transmitted to the corresponding wheel cylinder 40 connected to the first inlet valve 221a, thereby generating a braking force.

At this time, the second to fourth inlet valves 221b, 221c and 221d are controlled to be in the closed state, and the first to fourth outlet valves 222a, 222b, 222c and 222d are also maintained in the closed state. Also, the third dump valve 243 is controlled to be in the opened state so that the pressurized medium is filled from the reservoir 30 to the second pressure chamber 113 in a negative pressure state through the second dump passage 117.

Conversely, even when the hydraulic piston 114 moves backward, the hydraulic pressure in the respective wheel cylinders 40 may be individually controlled. As an example, a hydraulic pressure is generated in the second pressure chamber 113, and the first inlet valve 221a is controlled to be in the opened state and the hydraulic pressure transmitted to the first hydraulic circuit 201 through the hydraulic passages and the valve is transmitted to the corresponding wheel cylinder 40 on the first inlet valve 221a side and the first outlet valve 222a, thereby generating a braking force.

At this time, the second to fourth inlet valves 221b, 221c and 221d are controlled to be in the closed state, and the first to fourth outlet valves 222a, 222b, 222c and 222d are also maintained in the closed state.

That is, the electronic brake system 1 according to an embodiment of the present disclosure may selectively transmit the hydraulic pressure to or discharge the hydraulic pressure from the wheel cylinders 40 on the respective wheels RL, RR, FL and FR according to the required pressure by independently controlling the operations of the motor 120 and the respective valves, and thus may perform precise control of the braking pressure such as ABS.

Further, the electronic brake system 1 according to an embodiment of the present disclosure may discharge only the braking pressure transmitted to the corresponding wheel cylinder 40 through the first to fourth outlet valves 222a, 222b, 222c and 222d. This is referred to as a dump mode. As an example, as the first to fourth inlet valves 221a, 221b, 221c and 221d are controlled to be in the closed state and the first to third outlet valves 222a, 222b and 222c are also controlled to be in the closed state while only the fourth outlet valve 222d is controlled to be in the opened state, the hydraulic pressure in the wheel cylinder 40 provided on the front left wheel FL may be discharged to the reservoir 30 through the fourth outlet valve 222d.

The reason why the hydraulic pressure in the wheel cylinder 40 is discharged to the reservoir 30 through the outlet valve 222 is that the pressure inside the reservoir 30 is smaller than the pressure in the wheel cylinder 40. Since the pressure of the reservoir 30 is typically set at the atmospheric pressure level while the pressure in the wheel cylinder 40 is set higher than the atmospheric pressure, when the outlet valves 222 are opened, the hydraulic pressure in the wheel cylinders 40 may be quickly discharged to the reservoir 30.

Although not shown in the drawings, the hydraulic pressure may also be supplied to the remaining three wheels FR, RL, and RR by opening the fourth outlet valve 222d to discharge the hydraulic pressure in the corresponding wheel cylinder 40 and maintaining the first to third inlet valves 221a, 221b and 221c in the opened state.

As such, the electronic brake system 1 according to an embodiment of the present disclosure may selectively transmit the hydraulic pressure to or discharge the hydraulic pressure from the wheel cylinders 40 on the respective wheels RL, RR, FL and FR according to the required pressure by independently controlling the operations of the respective valves 221a, 221b, 221c, 221d, 222a, 222b, 222c, 222d, 233, 235, 236 and 243 of the hydraulic control unit 200, and thus may perform precise control of the braking pressure.

Further, the electronic brake system 1 according to an embodiment of the present disclosure may perform a balance mode in which the first pressure chamber 112 and the second pressure chamber 113 are balanced. The balance mode may be performed when the pressure in the first pressure chamber 112 and the second pressure chamber 113 are not balanced. As an example, if a leak occurs due to repeated operation of the hydraulic pressure supply apparatus 100 or an ABS operation occurs suddenly, the pressure balance between the first pressure chamber 112 and the second pressure chamber 113 is broken, so that the hydraulic piston 114 is not in the calculated position and a malfunction may occur.

In the balance mode, a balancing process may be performed so that the first and second pressure chambers 112 and 113 of the hydraulic pressure providing unit 110 are communicated to each other to balance the pressure. By sensing the hydraulic pressure of the first hydraulic circuit 201 and the hydraulic pressure of the second hydraulic circuit 202 by the passage pressure sensors PS21 and PS22, the electronic control unit may determine whether the pressure is unbalanced or not.

As an example, when the pressure of the first pressure chamber 112 is higher than the pressure of the second pressure chamber 113, the pressure of the first pressure chamber 112 and the pressure of the second pressure chamber 113 may be balanced by communicating with the first pressure chamber 112 and the second pressure chamber 113.

To this end, in the balanced mode, the third valve 233 and the sixth valve 236 may be controlled to be in the opened state to open the fifth hydraulic passage 215 and the eighth hydraulic passage 218. That is, the second hydraulic passage 212, the eighth hydraulic passage 218, the ninth hydraulic passage 219, the fifth hydraulic passage 215, and the fourth hydraulic passage 214 may be opened to communicate with the first pressure chamber 112 and the second pressure chamber 113, and thus the pressure of the first pressure chamber 112 and the pressure of the second pressure chamber 113 may be balanced.

At this time, the first to fourth inlet valves 221 are controlled to be in the closed state, and the motor 120 is operated to partially move the hydraulic piston 114 forward or backward so that the balancing mode may be performed quickly.

A modified example of the electronic brake system according to an embodiment of the present disclosure will be described below.

Figure 10:
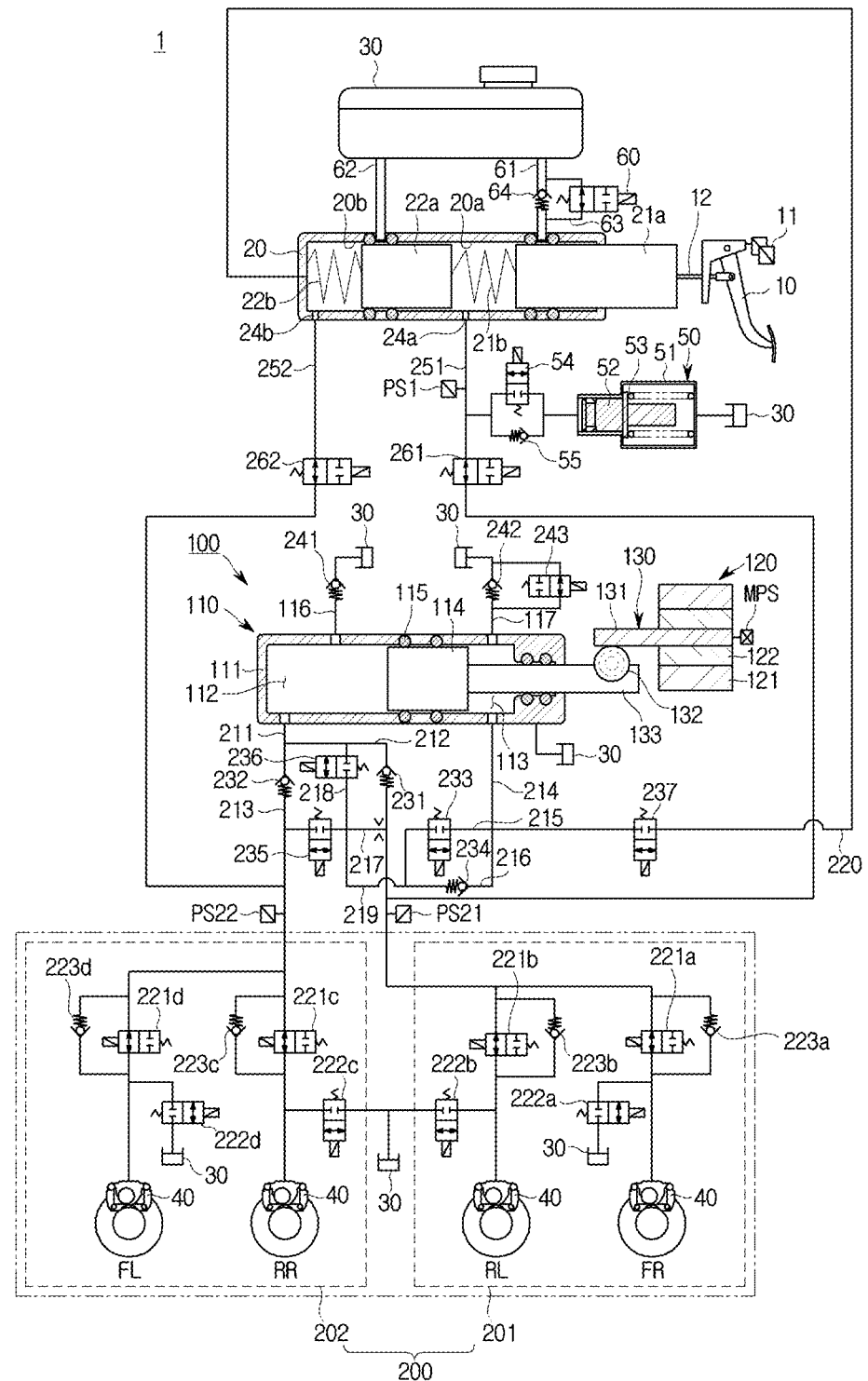
FIG. 10 is a hydraulic circuit diagram illustrating a modified example of an electronic brake system according to an embodiment of the present disclosure.

FIG. 10 is a hydraulic circuit diagram illustrating a modified example of the electronic brake system according to an embodiment of the present disclosure.

Referring to FIG. 10, the hydraulic control unit 200 of the electronic brake system 1 according to a modified example of the present disclosure may further include an auxiliary hydraulic passage 220 and an auxiliary valve 237 provided on the auxiliary hydraulic passage 220 to control the flow of the pressurized medium.

Specifically, the auxiliary hydraulic passage 220 may be provided to connect the second master chamber 20b of the master cylinder 20 and the second pressure chamber 113 of the hydraulic pressure supply apparatus 100, and the auxiliary valve 237 may be provided on the auxiliary hydraulic passage 220 to control the flow of the pressurized medium in both directions. The auxiliary valve 237 may be provided as a normally closed type solenoid valve that operates to be opened when receiving an electrical signal from the electronic control unit in a normally closed state.

Although FIG. 10 illustrates that the auxiliary hydraulic passage 220 is connected to the fourth hydraulic passage 214, the present disclosure is not limited thereto, and it should be understood that the auxiliary hydraulic passage 220 may be connected to various positions if the second master chamber 20b and the second pressure chamber 113 can be connected.

As the brake pedal 10 is operated in the normal operation mode, particularly in the state of providing the braking pressure in the high-pressure mode, displacements of the first piston 21a and the second piston 22a are generated, whereby the pressurized medium contained in the second master chamber 20b is pressurized. At the same time, the hydraulic piston 114 moves forward as the motor 120 of the hydraulic pressure providing unit 110 is operated, and at this time, a part of the hydraulic pressure of the pressurized medium formed in the second master chamber 20b may be supplied to the second pressure chamber 113 formed at the rear side of the hydraulic piston 114 by opening the auxiliary valve 237 provided on the auxiliary hydraulic passage 220.

The hydraulic pressure supplied from the second master chamber 20b to the second pressure chamber 113 through the auxiliary hydraulic passage 220 acts as an auxiliary force for advancing the hydraulic piston 114, thereby effectively generating a high-pressure braking force or enabling rapid braking. Of course, without the operation of the motor 120 in the low-pressure mode, the advancement of the hydraulic piston 114 may be achieved by the provision of the pressurized medium through the auxiliary hydraulic passage 220, thereby achieving the braking of the wheel cylinders 40. Therefore, in the case of a stop at an intersection, the stopping of the vehicle may be performed only by the hydraulic pressure of the pressurized medium provided through the auxiliary hydraulic passage 220 without the operation of the motor 120, thereby improving the durability of the motor 120 and preventing a malfunction or a fire due to heating or the like caused by the operation of the motor 120 for a long period of time.

As is apparent from the above, the electronic braking system according to an embodiment of the present disclosure has an effect of stably and effectively performing the braking in various operating situations of the vehicle.

Further, the electronic braking system according to an embodiment of the present disclosure has an effect of stably generating a high braking pressure.

Further, the electronic braking system according to an embodiment of the present disclosure has an effect of improving the performance and operational reliability of the product.

Further, the electronic braking system according to an embodiment of the present disclosure has an effect of stably providing a braking pressure even when a component fails or a pressurized medium leaks.

Further, the electronic braking system according to an embodiment of the present disclosure has an effect of reducing the size and weight of a product by reducing the number of components with a simple structure.

Further, the electronic braking system according to an embodiment of the present disclosure has an effect of improving the durability of the product by reducing the loads applied to the components.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
   a hydraulic pressure supply apparatus generating a hydraulic pressure by operating a hydraulic piston by an electrical signal output corresponding to a displacement of a brake pedal and including a first pressure chamber formed at one side of the hydraulic piston movably accommodated in a cylinder block and a second pressure chamber formed at the other side of the hydraulic piston; and
   a hydraulic control unit including a first hydraulic circuit for controlling the hydraulic pressure transmitted to two wheel cylinders and a second hydraulic circuit for controlling the hydraulic pressure transmitted to two other wheel cylinders,
   wherein the hydraulic control unit includes a first hydraulic passage communicating with the first pressure chamber, second and third hydraulic passages branched from the first hydraulic passage and connected to the first and second hydraulic circuits respectively, a fourth hydraulic passage communicating with the second pressure chamber, fifth and sixth hydraulic passages branched from the fourth hydraulic passage and rejoined with each other, a seventh hydraulic passage connecting the second hydraulic passage and the third hydraulic passage, an eighth hydraulic passage connecting the second hydraulic passage and the seventh hydraulic passage, and a ninth hydraulic passage connecting a point where the fifth and sixth hydraulic passages are rejoined with each other to the seventh or eighth hydraulic passage.

2. The electronic brake system according to claim 1, wherein the hydraulic control unit includes a first valve provided on the second hydraulic passage to control the flow of a pressurized medium, a second valve provided on the third hydraulic passage to control the flow of the pressurized medium, a third valve provided on the fifth hydraulic passage to control the flow of the pressurized medium, a fourth valve provided on the sixth hydraulic passage to control the flow of the pressurized medium, a fifth valve provided on the seventh hydraulic passage to control the flow of the pressurized medium, and a sixth valve provided on the eighth hydraulic passage to control the flow of the pressurized medium.

3. The electronic brake system according to claim 2, wherein the first valve is provided as a check valve allowing only the flow of the pressurized medium in a direction from the first pressure chamber to the first hydraulic circuit, the second valve is provided as a check valve allowing only the flow of the pressurized medium in a direction from the first pressure chamber to the second hydraulic circuit, the fourth valve is provided as a check valve allowing only the flow of the pressurized medium in a direction from the second pressure chamber to the seventh or eighth hydraulic passage, and the third, fifth and sixth valves are provided as solenoid valves controlling the flow of the pressurizing medium in both directions.

4. The electronic brake system according to claim 3, further comprising a master cylinder having first and second master chambers and first and second pistons provided respectively in the first and second master chambers, and discharging the pressurized medium by the pressing force of the brake pedal.

5. The electronic brake system according to claim 4, further comprising:

a first dump passage connecting the first pressure chamber and a reservoir storing the pressurized medium;

a second dump passage connecting the second pressure chamber and the reservoir;

a first dump valve provided on the first dump passage to control the flow of the pressurized medium and provided as a check valve allowing only the flow of the pressurized medium in a direction from the reservoir to the first pressure chamber;

a second dump valve provided on the second dump passage to control the flow of the pressurized medium and provided as a check valve allowing only the flow of the pressurized medium in a direction from the reservoir to the second pressure chamber; and a third dump valve provided on a bypass passage connected in parallel with respect to the second dump valve on the second dump passage to control the flow of the pressurized medium and provided as a solenoid valve controlling the flow of the pressurized medium in both directions between the reservoir and the second pressure chamber.

6. The electronic brake system according to claim 5, further comprising:

a reservoir passage connecting the reservoir and the master cylinder, wherein the reservoir passage includes:

a first reservoir passage connecting the first master chamber and the reservoir;

a second reservoir passage connecting the second master chamber and the reservoir;

a reservoir check valve provided on the first reservoir passage to control the flow of the pressurized medium and allowing only the flow of the pressurized medium in a direction from the reservoir to the first master chamber; and an inspection valve provided on a bypass passage connected in parallel with respect to the reservoir check valve on the first reservoir passage to control the flow of the pressurized medium and provided as a solenoid valve controlling the flow of the pressurized medium in both directions between the first master chamber and the reservoir.

7. The electronic brake system according to claim 6, further comprising:

a first backup passage connecting the first master chamber and the first hydraulic circuit;

a second backup passage connecting the second master chamber and the second hydraulic circuit;

a first cut valve provided on the first backup passage to control the flow of the pressurized medium; and a second cut valve provided on the second backup passage to control the flow of the pressurized medium.

8. The electronic brake system according to claim 7, further comprising:

a simulation apparatus connected to the master cylinder to provide a reaction force to the pressing force of the brake pedal; and a simulator valve for opening and closing a passage between the master cylinder and the simulation apparatus.

9. A method of operating the electronic brake system according to claim 7, wherein in an abnormal operation mode, the first cut valve is opened to communicate with the first master chamber and the first hydraulic circuit, and the second cut valve is opened to communicate with the second master chamber and the second hydraulic circuit.

10. A method of operating the electronic brake system according to claim 8, wherein in an inspection mode for checking whether the master cylinder or the simulator valve is leaking, the inspection valve and the second cut valve are closed and the first cut valve is opened, a hydraulic pressure generated by an operation of the hydraulic pressure supply apparatus is provided to the first master chamber, and a hydraulic pressure value of the pressurized medium expected to be generated based on a displacement amount of the hydraulic piston is compared with the hydraulic pressure value of the pressurized medium provided to the first master chamber.

11. A method of operating the electronic brake system according to claim 3, wherein in a normal operation mode, a low-pressure mode for providing a relatively low hydraulic pressure and a high-pressure mode for providing a relatively high hydraulic pressure are operated sequentially in accordance with the level of the hydraulic pressure transmitted from the hydraulic pressure supply apparatus to the wheel cylinders.

12. The method of operating the electronic brake system according to claim 11, wherein in the low-pressure mode, the fifth and sixth valves are opened, and a hydraulic pressure formed in the first pressure chamber by the forward movement of the hydraulic piston is provided to the first hydraulic circuit and the second hydraulic circuit.

13. The method of operating the electronic brake system according to claim 12, wherein in the high-pressure mode, the fifth and sixth valves are opened, a part of the hydraulic pressure formed in the first pressure chamber by the forward movement of the hydraulic piston after the low-pressure mode is provided to the first hydraulic circuit and the second hydraulic circuit, the third valve is opened, and a remaining part of the hydraulic pressure formed in the first pressure chamber is supplied to the second pressure chamber.

14. The method of operating the electronic brake system according to claim 12, wherein in the release of the low-pressure mode, the fifth and sixth valves are opened, and a negative pressure is formed in the first pressure chamber by the backward movement of the hydraulic piston so that the pressurized medium in the first hydraulic circuit and the second hydraulic circuit is recovered into the first pressure chamber.

15. The method of operating the electronic brake system according to claim 13, wherein in the release of the high-pressure mode, the fifth and sixth valves are opened, a negative pressure is formed in the first pressure chamber by the backward movement of the hydraulic piston so that the pressurized medium in the first hydraulic circuit and the second hydraulic circuit is recovered into the first pressure chamber, the third valve is opened, and the pressurized medium in the second pressure chamber is supplied to the first pressure chamber.

* * * * *